(12) United States Patent
Shimada et al.

(10) Patent No.: US 11,745,403 B2
(45) Date of Patent: Sep. 5, 2023

(54) INJECTION MOLDING SYSTEM, MOLDING CONDITION CORRECTION SYSTEM, AND INJECTION MOLDING METHOD

(71) Applicant: Hitachi, Ltd., Tokyo (JP)

(72) Inventors: Ryotaro Shimada, Tokyo (JP); Satoshi Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 17/330,528

(22) Filed: May 26, 2021

(65) Prior Publication Data
US 2021/0370568 A1 Dec. 2, 2021

(30) Foreign Application Priority Data
May 27, 2020 (JP) ................. 2020-092201

(51) Int. Cl.
*B29C 45/77* (2006.01)
*B29C 45/76* (2006.01)
(Continued)

(52) U.S. Cl.
CPC ............ *B29C 45/766* (2013.01); *B29C 45/77* (2013.01); *B29C 45/78* (2013.01); *B29C 45/80* (2013.01);
(Continued)

(58) Field of Classification Search
None
See application file for complete search history.

(56) References Cited

U.S. PATENT DOCUMENTS

| | | |
|---|---|---|
| 2013/0345855 A1 | 12/2013 | Tsai et al. |
| 2020/0307053 A1 | 10/2020 | Shimada et al. |

FOREIGN PATENT DOCUMENTS

| | | |
|---|---|---|
| DE | 10 2020 107 463 A1 | 10/2020 |
| JP | 5-169507 A | 7/1993 |

(Continued)

OTHER PUBLICATIONS

Haramoto JPH05169507A English Translation 1993 (Year: 1993).*
(Continued)

*Primary Examiner* — Jacob T Minskey
*Assistant Examiner* — Adrien J Bernard
(74) *Attorney, Agent, or Firm* — Crowell & Moring LLP

(57) ABSTRACT

An injection molding system includes a step of determining a manufacturing condition including a combination of a first mold and a first injection molding machine, a step of confirming presence or absence of a first track record in production, in which a combination of the first mold and the first injection molding machine is used, by searching a production-track-record storage unit to, and a step of producing, in a case of the absence of the first track record in production, a corrected molding condition for injection molding by using the combination of the first injection molding machine and the first mold, based on first molding machine-specific information acquired in advance for the first injection molding machine, second molding machine-specific information acquired in advance for a second injection molding machine that is combined with the first mold and has a second track record in production, and the second track record in production acquired from the production-track-record storage unit. In the step, at least an amount of resin injected from the first injection molding machine into the first mold is corrected, and the produced corrected molding condition is inputted to the second injection molding machine.

10 Claims, 26 Drawing Sheets

(51) Int. Cl.
*B29C 45/78* (2006.01)
*B29C 45/80* (2006.01)

(52) U.S. Cl.
CPC ............ *B29C 2945/7604* (2013.01); *B29C 2945/76006* (2013.01); *B29C 2945/7609* (2013.01); *B29C 2945/76187* (2013.01); *B29C 2945/76367* (2013.01); *B29C 2945/76404* (2013.01)

(56) References Cited

FOREIGN PATENT DOCUMENTS

| JP | H05169507 A | * | 7/1993 | ............ Y02P 80/30 |
| JP | 2002-307512 A | | 10/2002 | |
| JP | 3613764 B2 | | 1/2005 | |
| JP | 5709328 B2 | | 4/2015 | |

OTHER PUBLICATIONS

Chinese-language Office Action issued in Chinese Application No. 202110525430.5 dated Jan. 18, 2023 with partial English translation (17 pages).
German-language Office Action issued in German Application No. 10 2021 205 390.4 dated May 25, 2023 with English translation (12 pages).

* cited by examiner

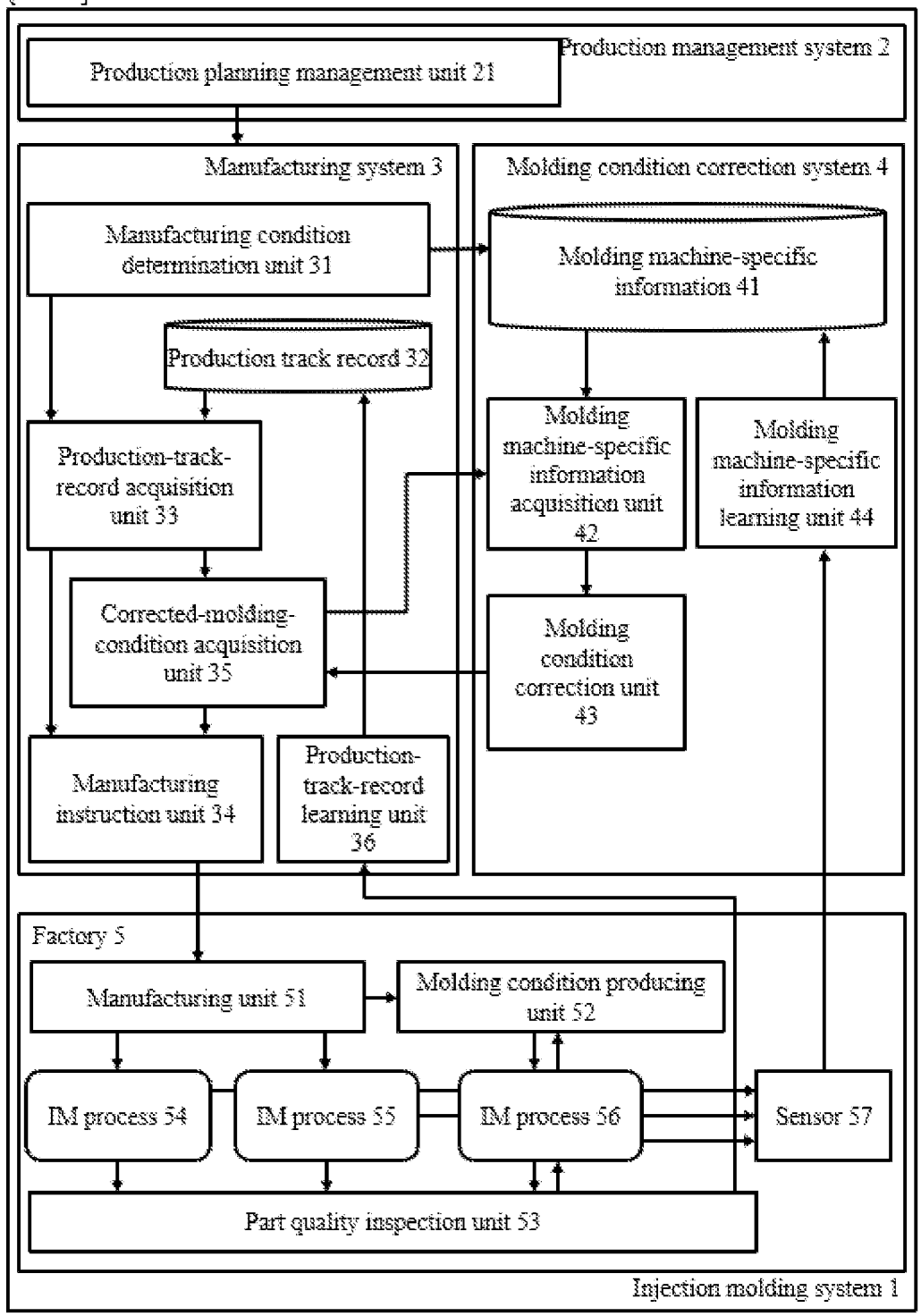

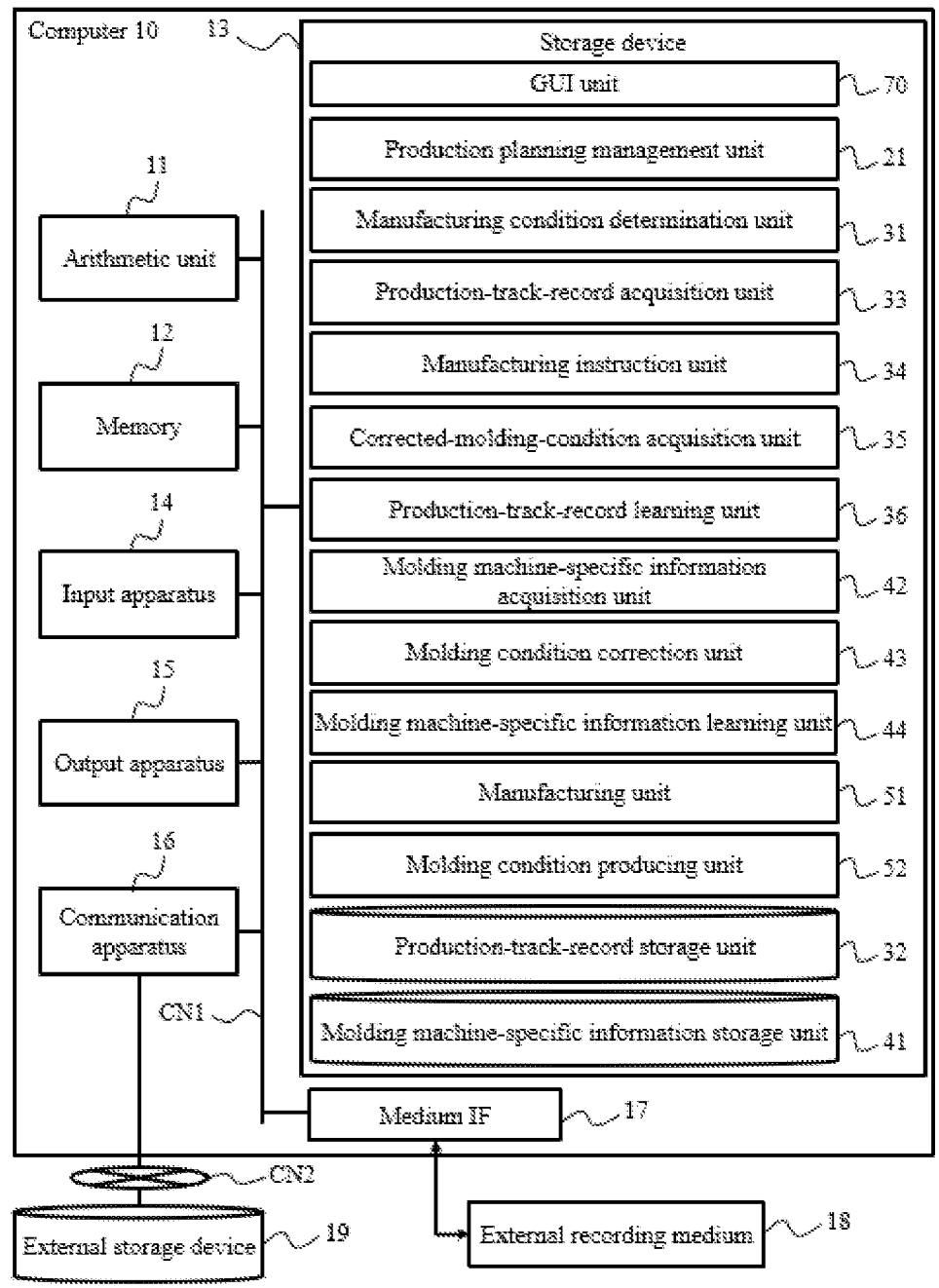

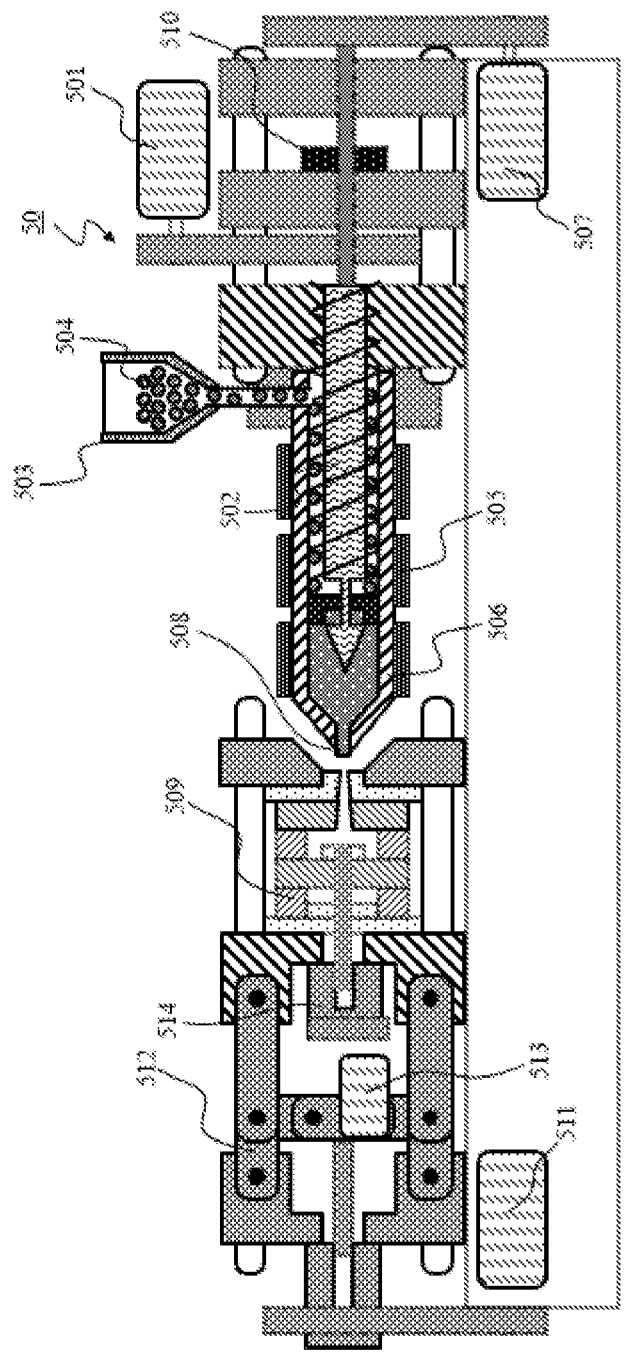
[Fig. 3]

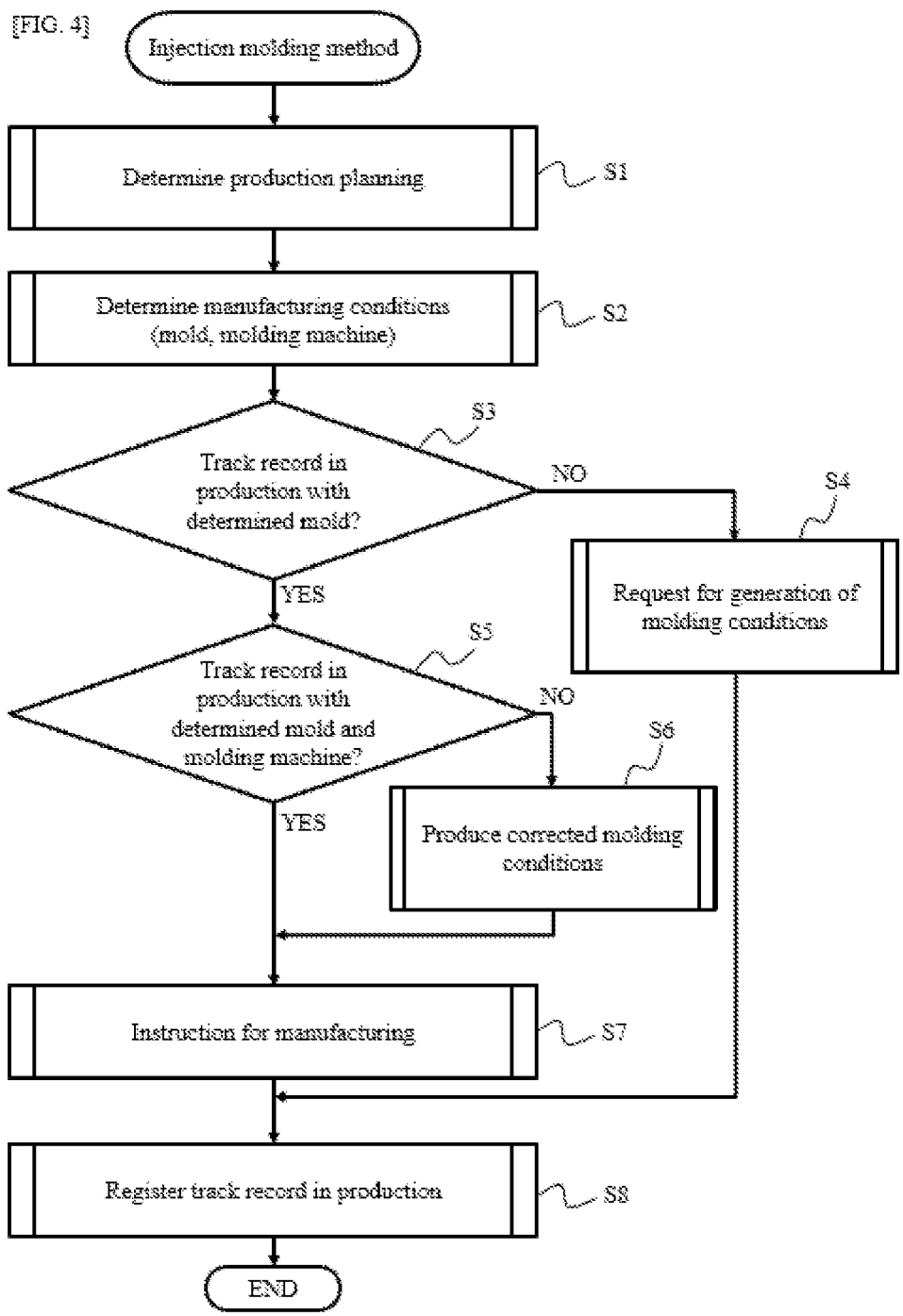

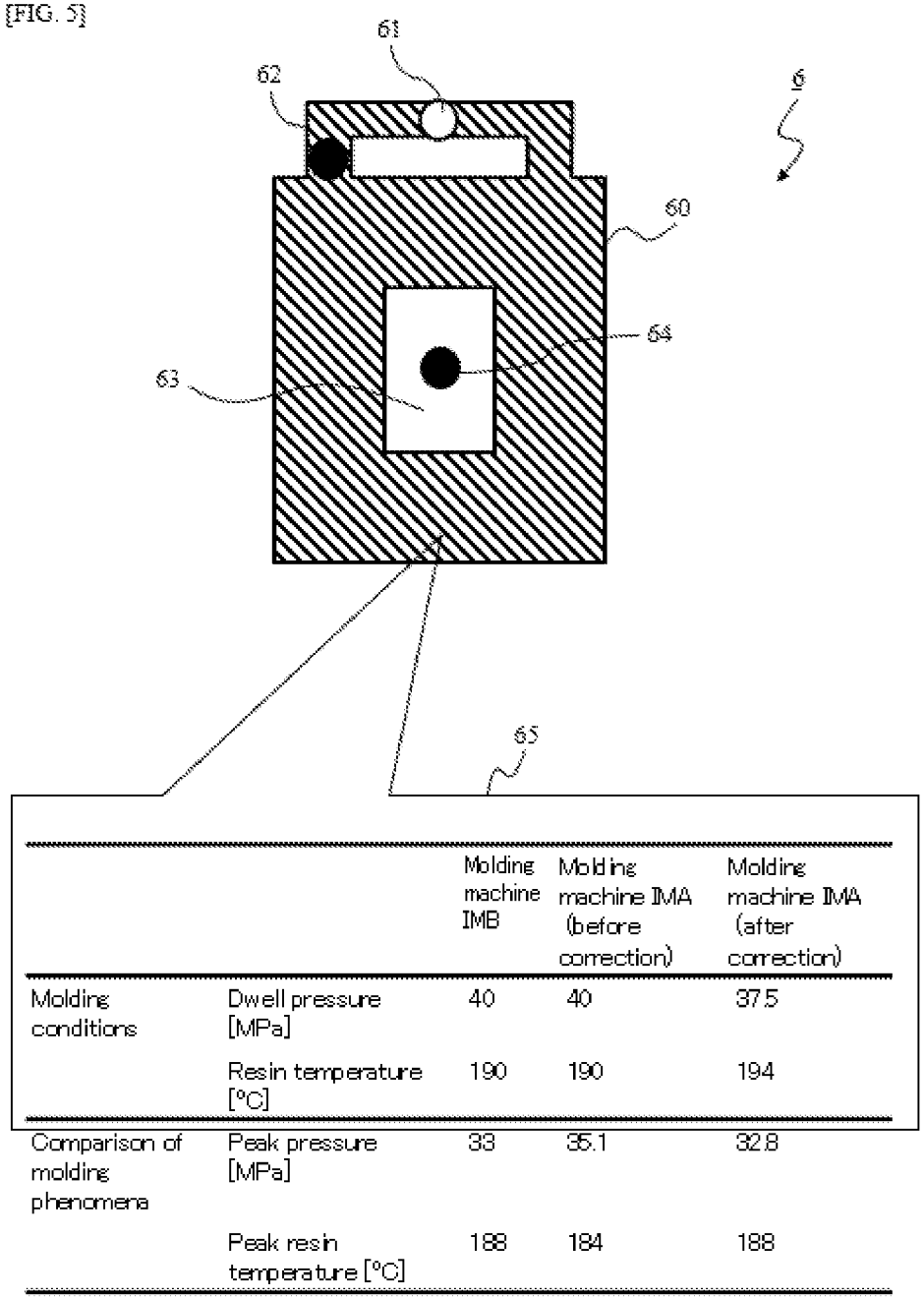
[FIG. 5]

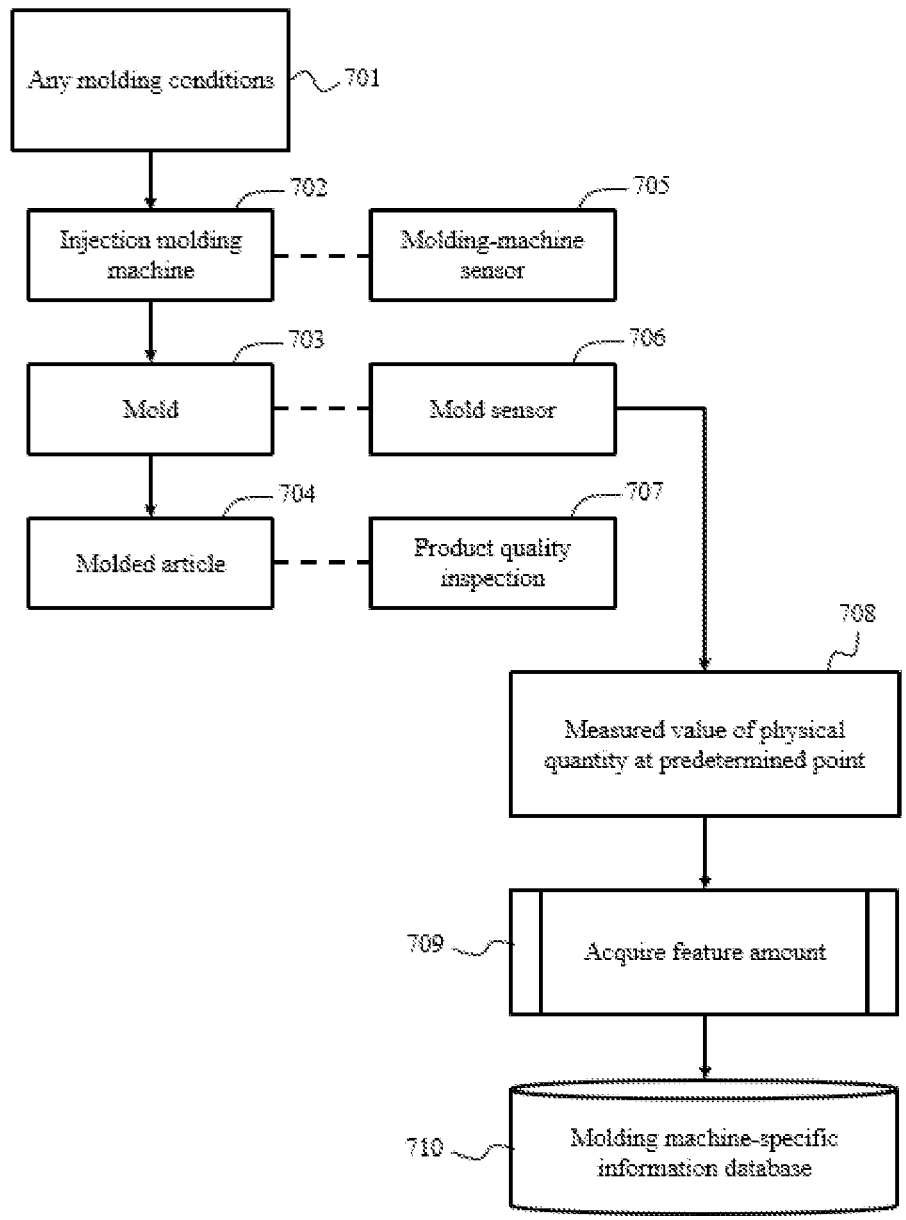
[FIG. 6]

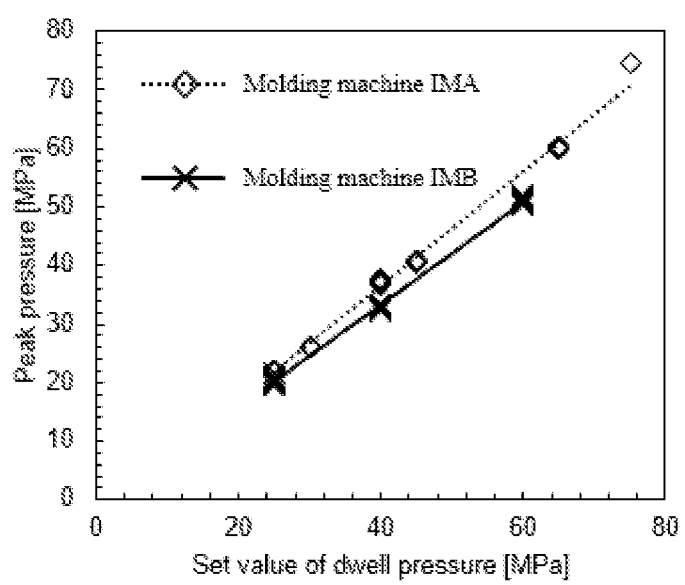
[FIG. 7]

[FIG. 8]
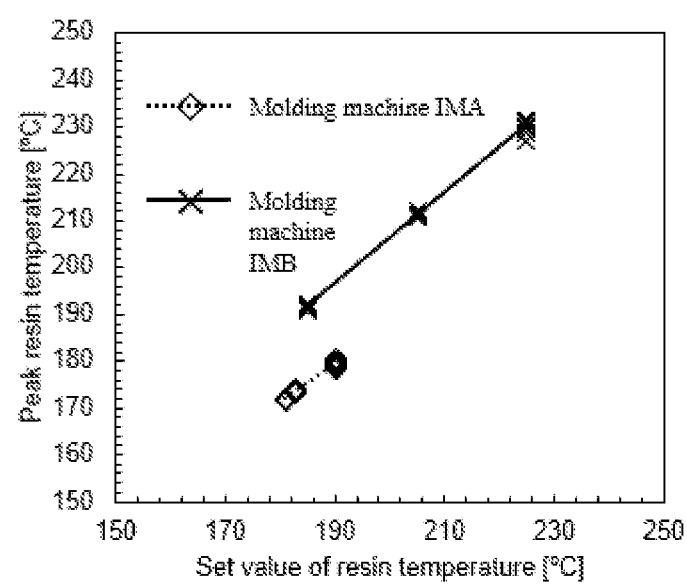

[FIG. 9]
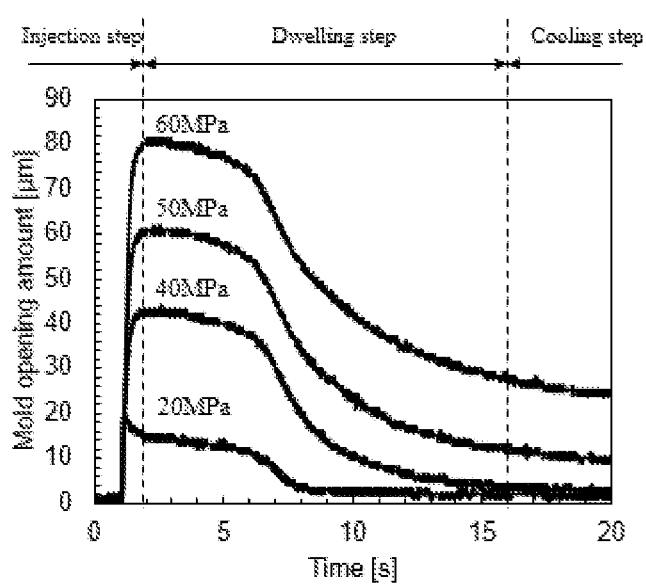

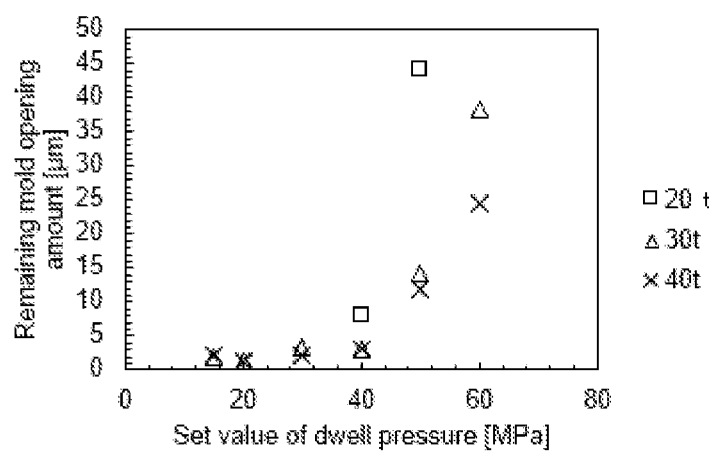
[FIG. 10]

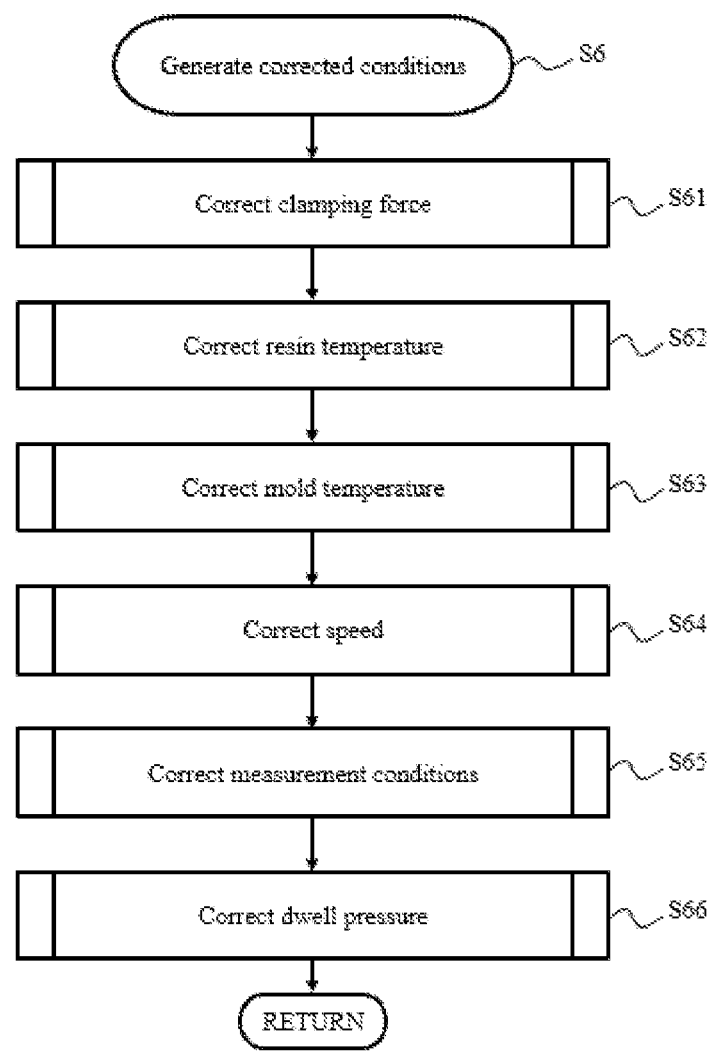

|     | Pmax   | PTmmax | PTmax | diff Pmax | diff Tmax | int P@I | int P@H |
|-----|--------|--------|-------|-----------|-----------|---------|---------|
| Thp | Middle | Low    | Low   | Low       | Low       | Low     | High    |
| HP  | High   | Low    | Low   | Low       | Low       | High    | High    |
| IS  | High   | Low    | Low   | High      | High      | Middle  | Middle  |
| VP  | High   | Low    | Low   | High      | Low       | High    | High    |
| Tr  | High   | High   | High | High   | High      | Middle  | Low     |
| Tm  | Middle | High   | Low   | Low       | Low       | High    | Middle  |

2

|     | Pmax   | PTmmax | PTmax | diff Pmax | diff Tmax | int P@I | int P@H |
|-----|--------|--------|-------|-----------|-----------|---------|---------|
| Thp | Middle | Low    | Low   | Low       | Low       | Low     | High    |
| HP  | High   | Low    | Low   | Low       | Low       | High    | High    |
| IS  | High   | Low    | Low   | High      | High      | Middle  | Middle  |
| VP  | High   | Low    | Low   | High      | Low       | High    | High    |
| Tm  | Middle | High | Low | Low       | Low       | High    | Middle  |

3

|     | Pmax   | PTmmax | PTmax | diff Pmax | diff Tmax | int P@I | int P@H |
|-----|--------|--------|-------|-----------|-----------|---------|---------|
| Thp | Middle | Low    | Low   | Low       | Low       | Low     | High    |
| HP  | High   | Low    | Low   | Low       | Low       | High    | High    |
| IS  | High   | Low    | Low   | High      | High  | Middle  | Middle  |
| VP  | High   | Low    | Low   | High      | Low       | High    | High    |

4

|     | Pmax   | PTmmax | PTmax | diff Pmax | diff Tmax | int P@I | int P@H |
|-----|--------|--------|-------|-----------|-----------|---------|---------|
| Thp | Middle | Low    | Low   | Low       | Low       | Low     | High    |
| HP  | High   | Low    | Low   | Low       | Low       | High    | High    |
| VP  | High   | Low    | Low   | High  | Low       | High    | High    |

5

|     | Pmax   | PTmmax | PTmax | diff Pmax | diff Tmax | int P@I | int P@H |
|-----|--------|--------|-------|-----------|-----------|---------|---------|
| Thp | Middle | Low    | Low   | Low       | Low       | Low     | High    |
| HP  | High   | Low    | Low   | Low       | Low       | High | High   |

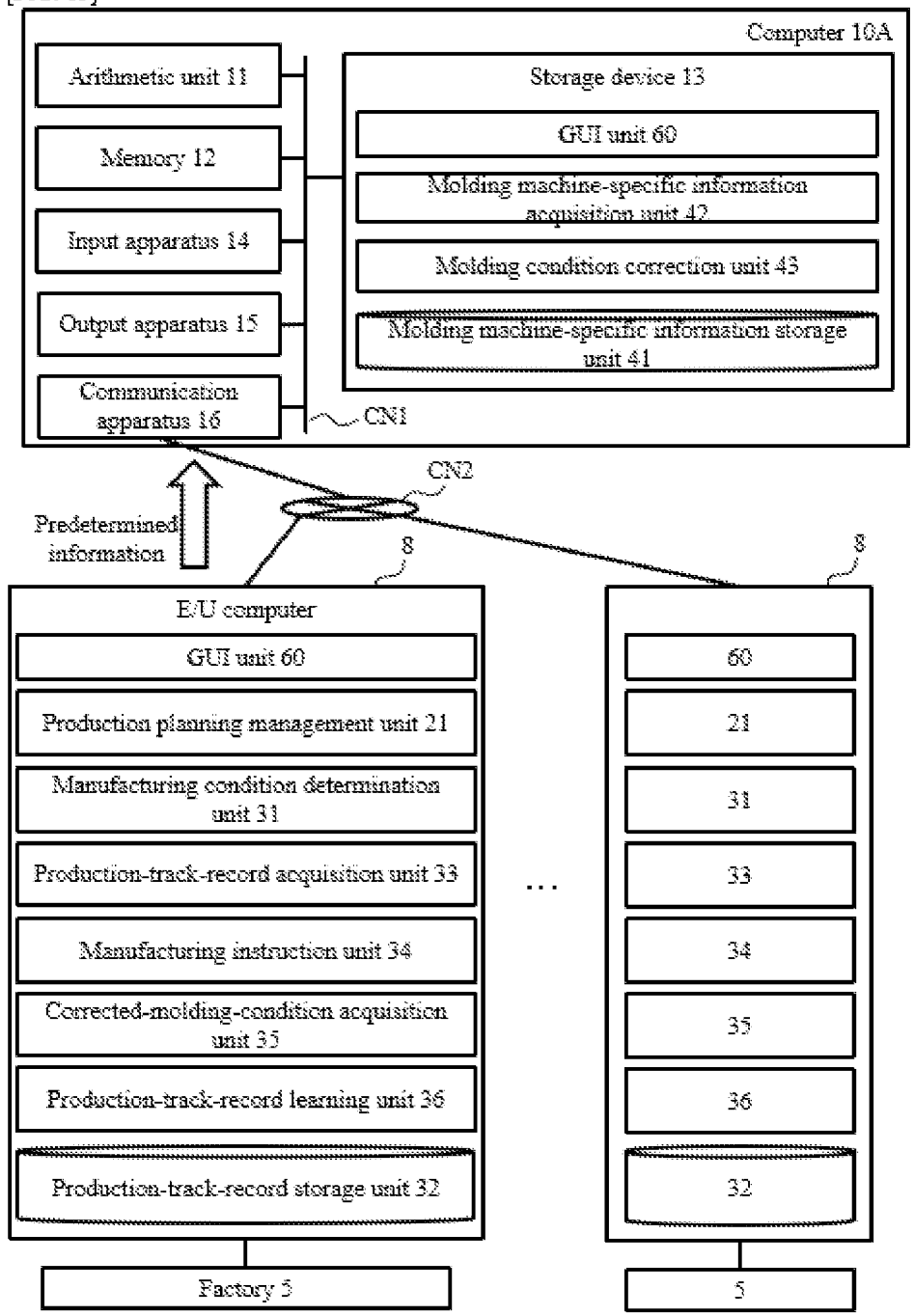

[FIG. 14]
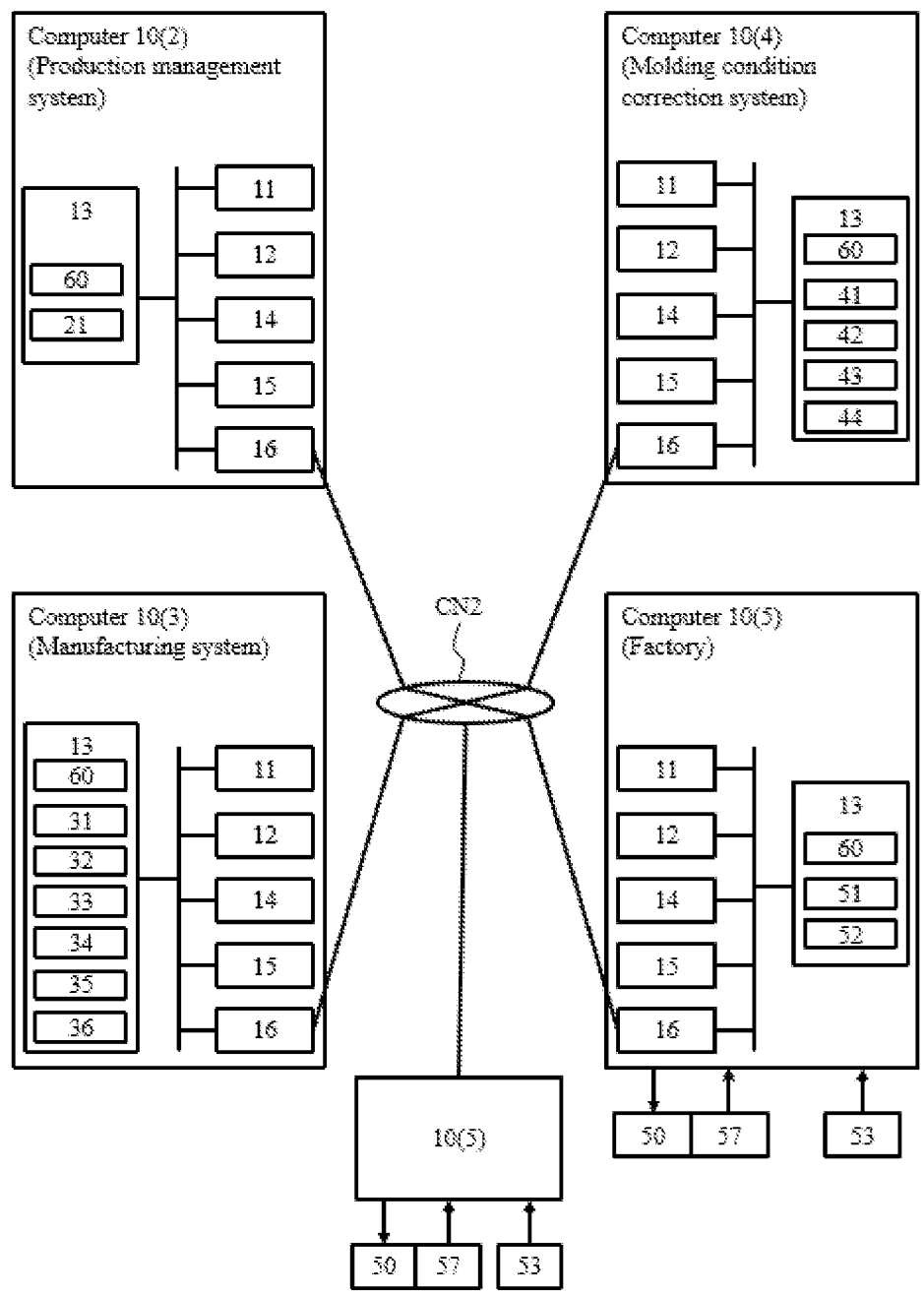

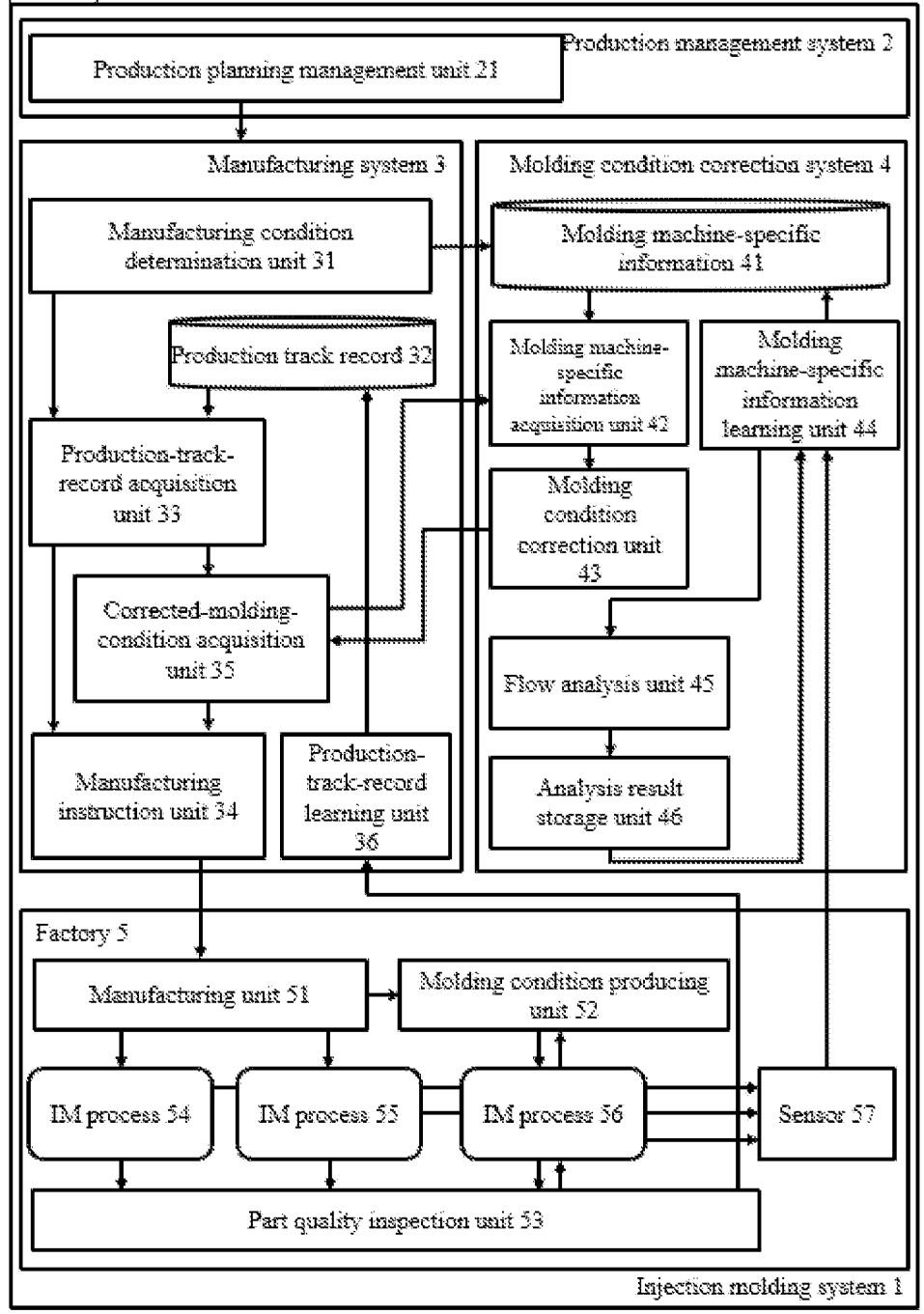

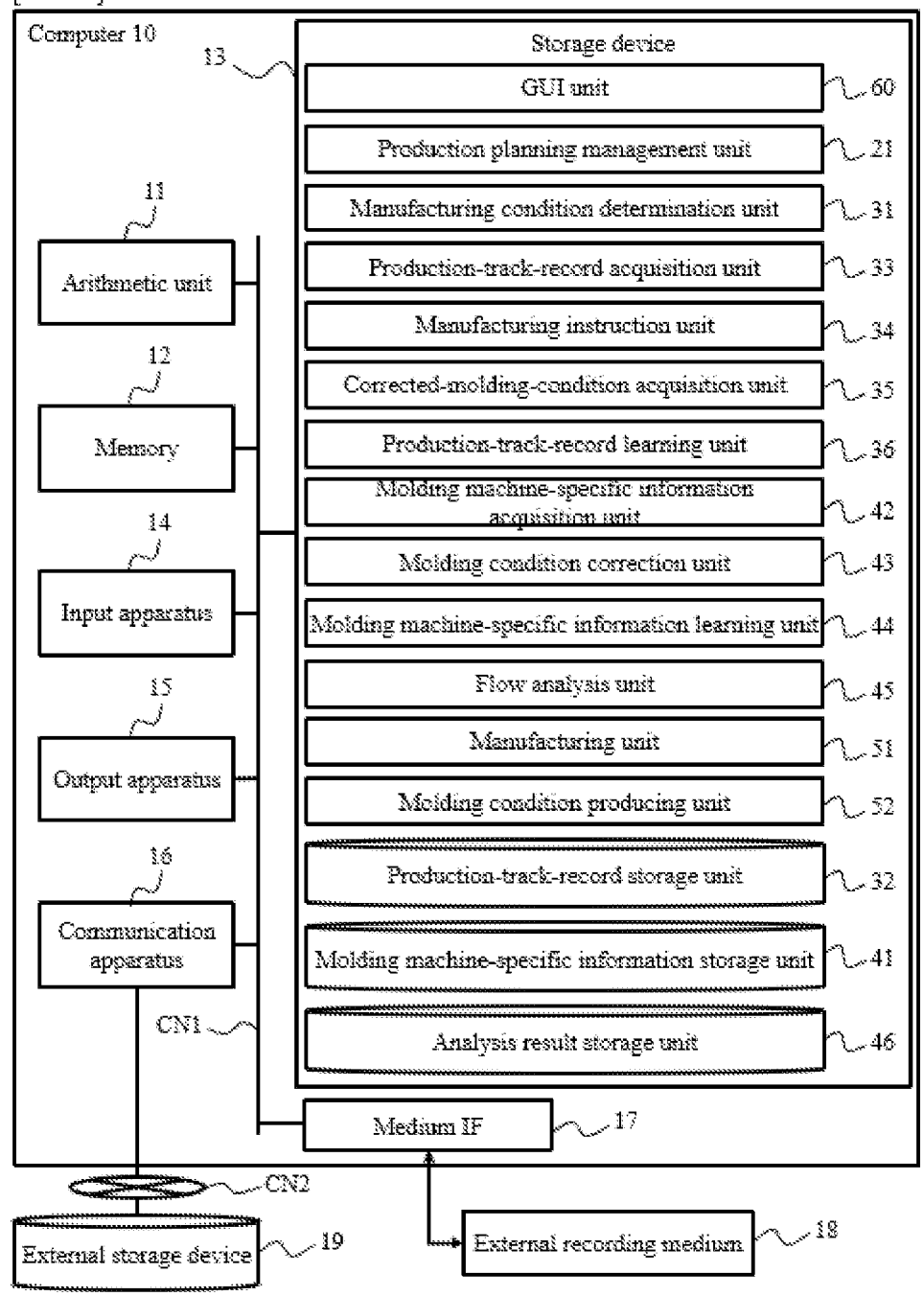

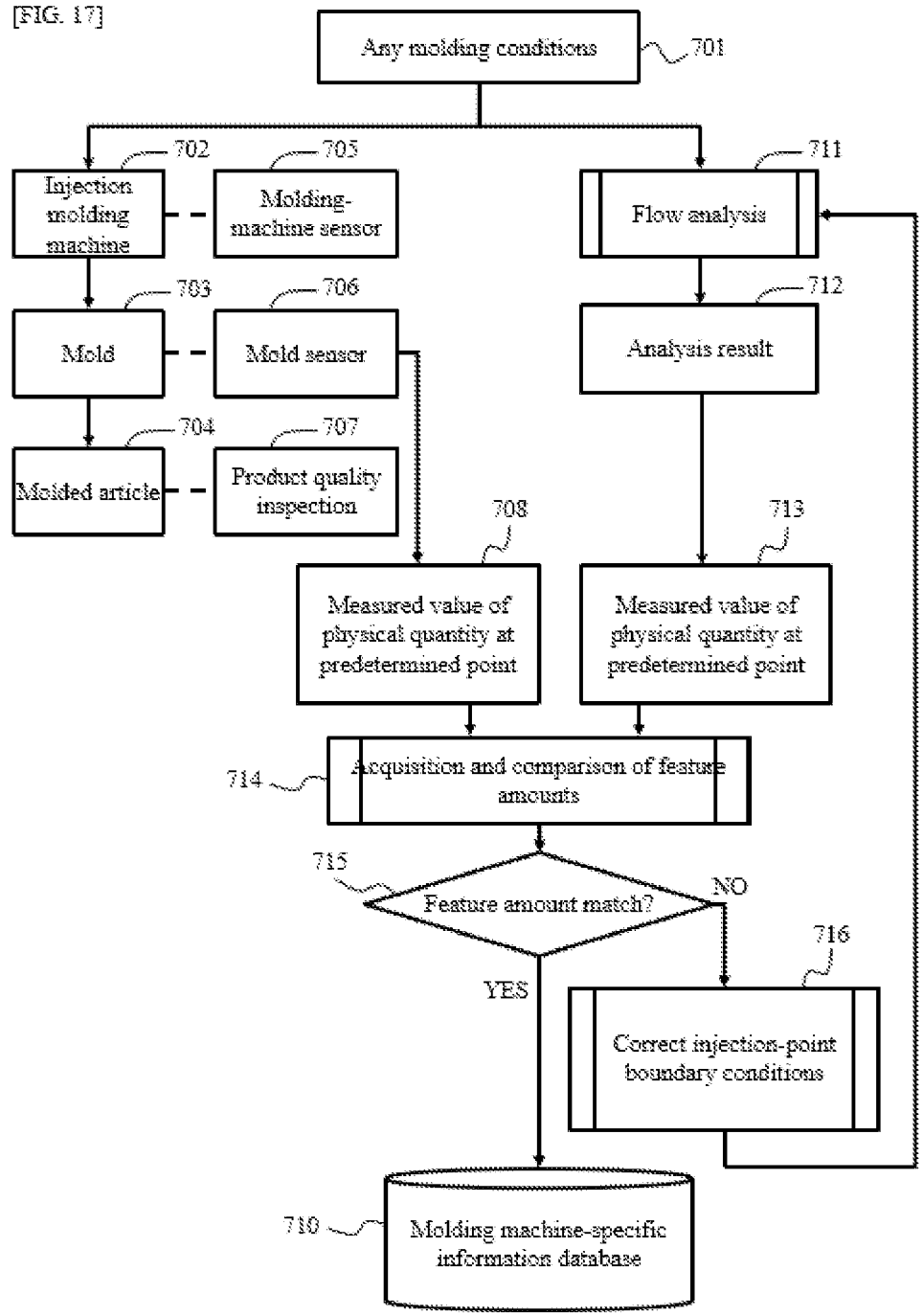

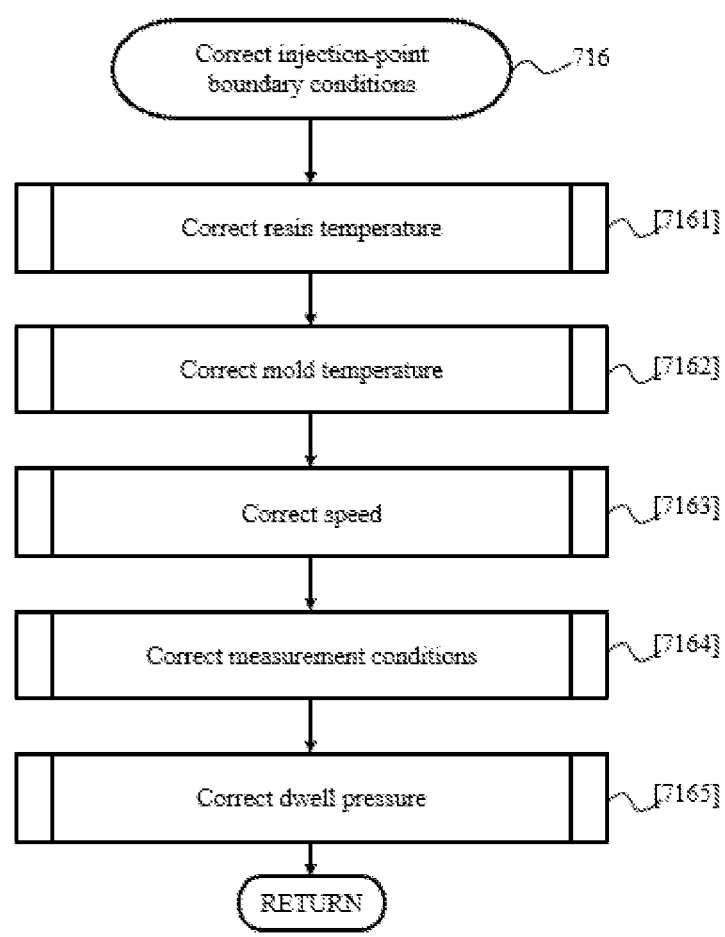

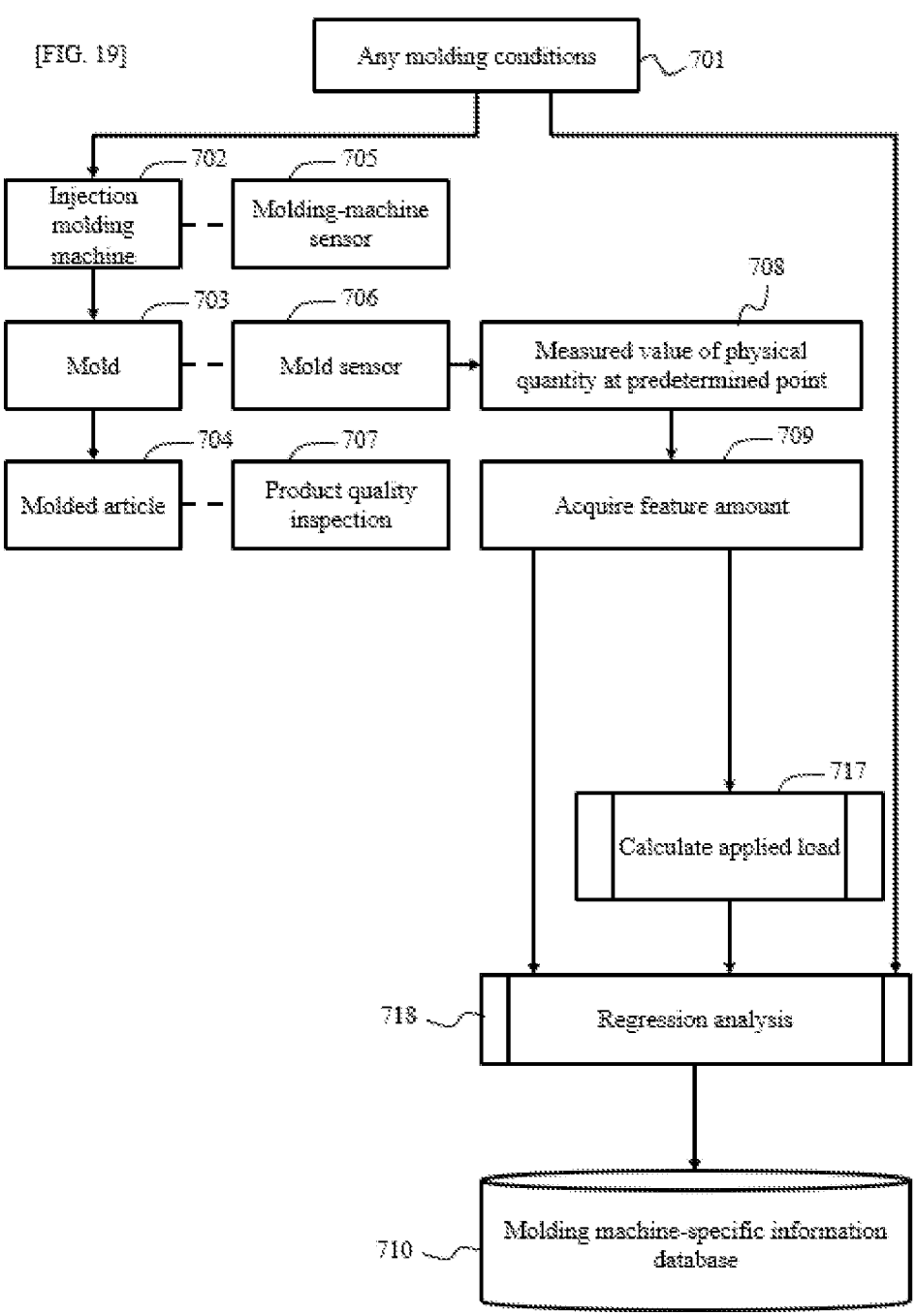

[FIG. 20]
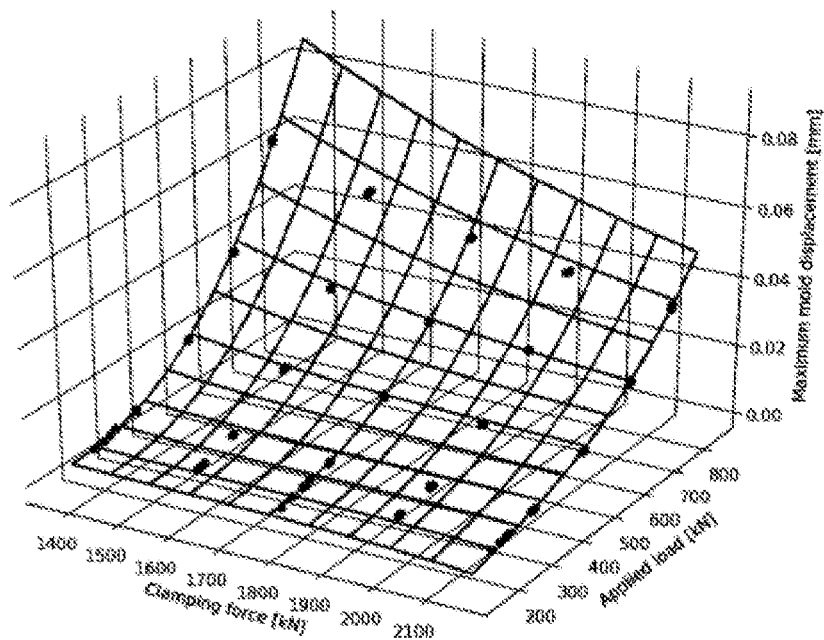

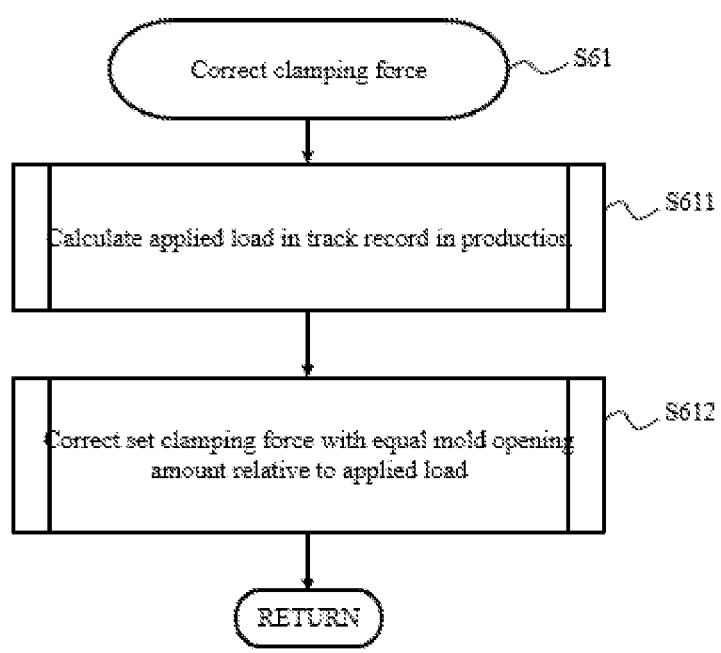
[FIG. 21]

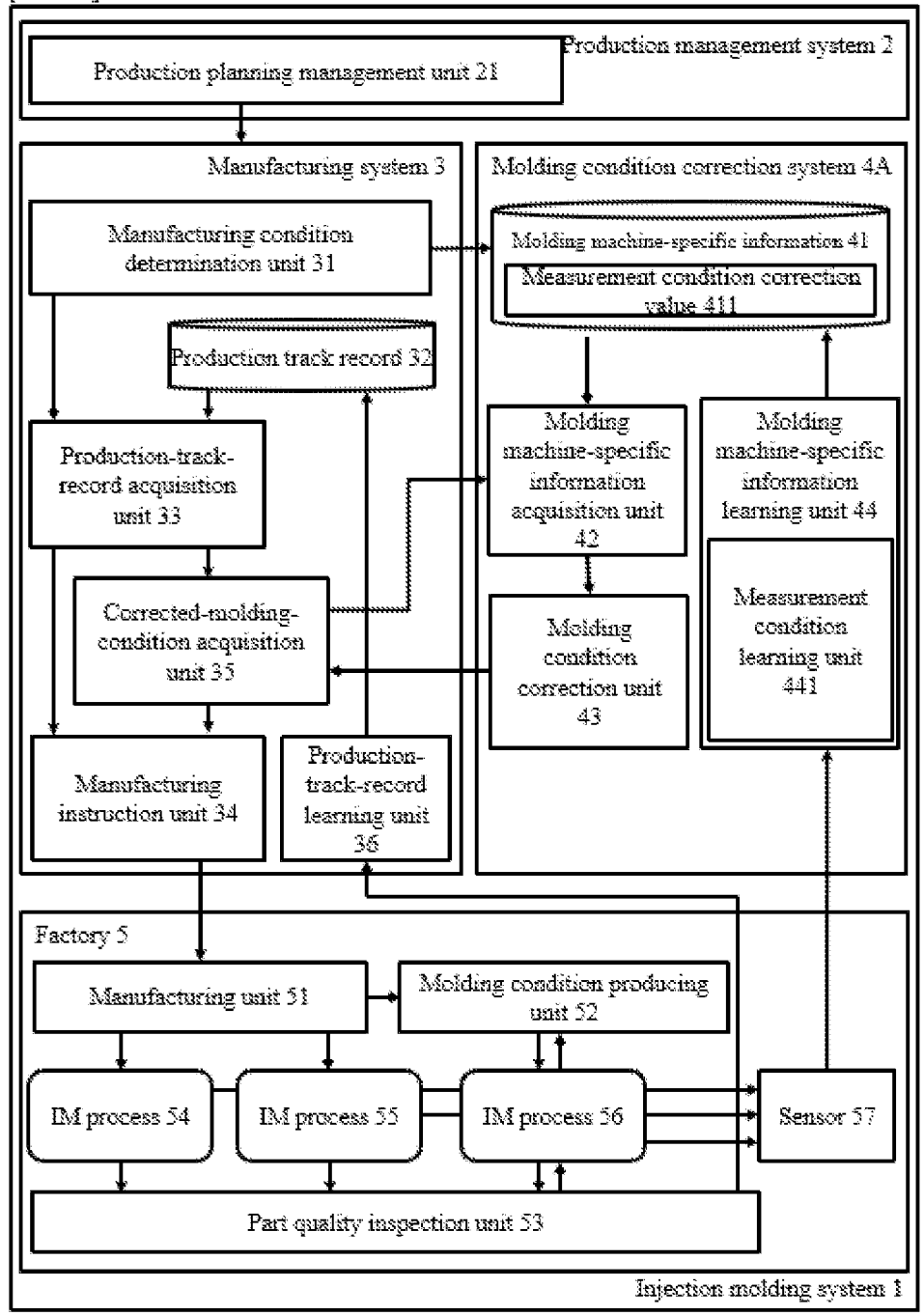
[FIG. 22]

[FIG. 23]
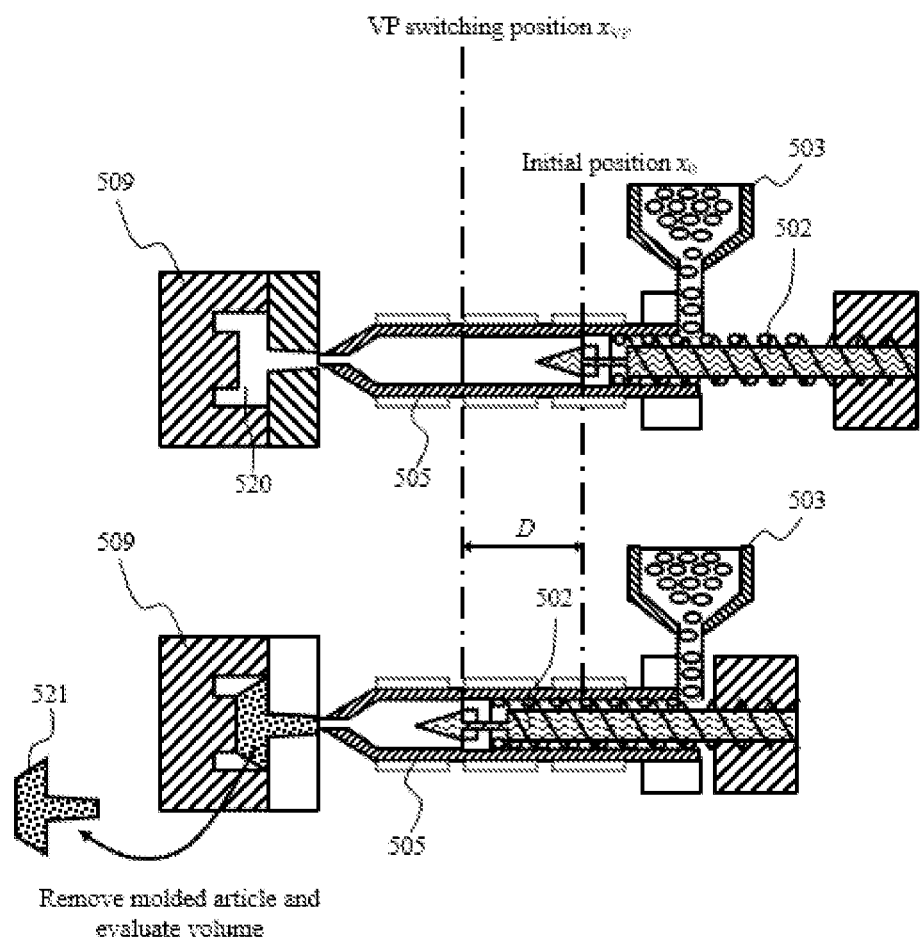
Remove molded article and evaluate volume

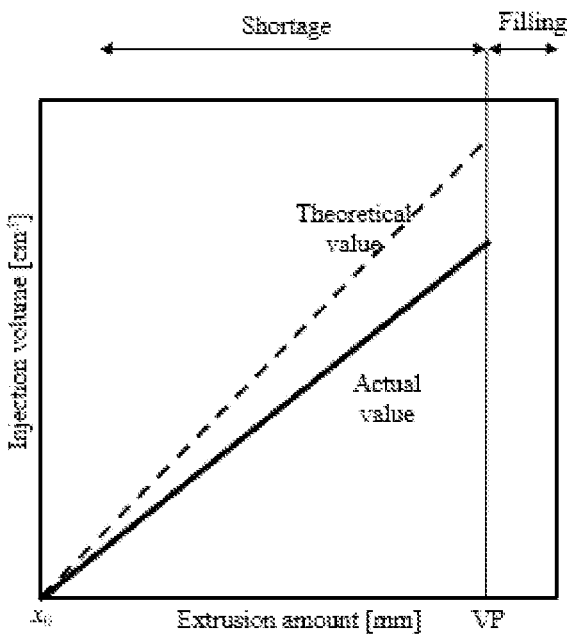
[FIG. 24]

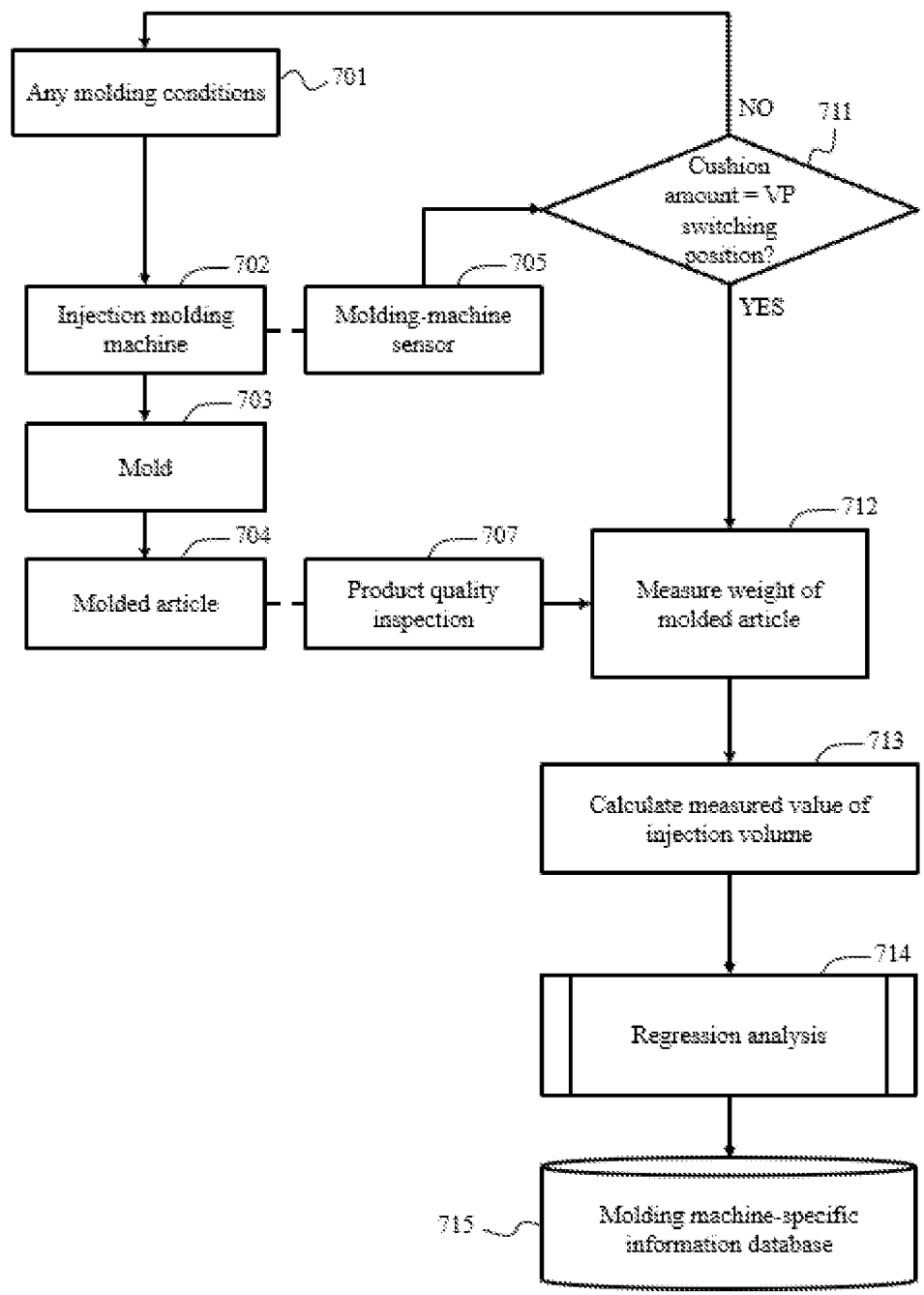
[FIG. 25]

[FIG. 26]

S1) Change cylinder extrusion amount for molding in state of shortage, and acquire correlation of injection volume relative to cylinder extrusion amount to perform regression analysis.

$$V_{m,A} = a_A D_A \frac{\pi d_A^2}{4}, \quad D_A = x_{0,A} - x_{VP,A} \ldots \text{(Expression 15)}$$

$$V_{m,B} = a_B D_B \frac{\pi d_B^2}{4}, \quad D_B = x_{0,B} - x_{VP,B} \ldots \text{(Expression 16)}$$

($V_m$: measured value of injection volume, $d$: screw diameter, $D$: cylinder extrusion amount, $a$: regression coefficient, $x_0$: measurement position, $x_{VP}$: VP switching position, $A, B$: molding machine)

S2) When machine difference from molding machine A to molding machine B is corrected, correct measurement position, speed switching position, and VP switching position according to expressions below.

$$x_{0,B} = \frac{d_A^2}{d_B^2} x_{0,A} \ldots \text{(Expression 17)}$$

$$x_{i,B} = x_{0,B} - \frac{a_A d_A^2}{a_B d_B^2}(x_{0,A} - x_{i,A}) \ldots \text{(Expression 18)}$$

$$x_{VP,B} = x_{0,B} - \frac{a_A d_A^2}{a_B d_B^2}(x_{0,A} - x_{VP,A}) \ldots \text{(Expression 19)}$$

($x_i$: i-th speed switching position)

INJECTION MOLDING SYSTEM, MOLDING CONDITION CORRECTION SYSTEM, AND INJECTION MOLDING METHOD

BACKGROUND

The present invention relates to an injection molding system, a molding condition correction system, and an injection molding method.

In Japanese Patent No. 5709328, a resin flow is analyzed in a cloud server on the basis of a mechanical parameter, optimum injection conditions are generated, and injection molding is performed under the optimum injection conditions downloaded for a fully automatic injection molding machine. Japanese Patent No. 5709328 describes that "The plastic product manufacturing method integrates expert system architectures in upstream and downstream ends (such as machinery factories, product designing plants, and mold flow analysis software plants) by using a cloud server, so as to integrate the best manufacturing solution of a plastic product in the cloud. Furthermore, a controller of an all-electric injection-molding machine can obtain the best manufacturing solution of a plastic product from a cloud server. Therefore, the schedule of the all-electric injection-molding machine can be reduced, and experience of setting and adjusting the machine can be systematically stored and utilized. As a result, the loss of experienced technicians does not adversely affect manufacture, and the quality of the plastic product can be optimized".

Japanese Patent No. 3613764 discloses a molding-condition conversion program in an injection molding machine for transferring molding conditions for one injection molding machine to another injection molding machine of a different model. Japanese Patent No. 3613764 describes that "The storage means B stores the specifications, such as the screw diameter of an injection molding machine that has been used, and the molding conditions including the injection speed, the injection speed switching position, and the mold filling time of the injection step that have been used for this injection molding machine, with the specification and conditions being inputted from the input unit A, and stores the specifications, such as the screw diameter of an injection molding machine that is to be used from now on. Various data stored in the storage means is substituted into a predetermined transformation by the computing means C, with the transformation being obtained under preconditions for the same filling amount and filling time of a material into the mold. Thus, molding conditions including an injection speed and an injection speed switching position in the injection molding machine that is to be used from now on can be determined by a computation. The display means D displays the molding conditions including an injection speed and an injection speed switching position in the injection molding machine to be used from now on, with the molding conditions being determined by the computing means C".

SUMMARY

In the method of Japanese Patent No. 5709328, a resin flow is analyzed in the cloud server on the basis of the mechanical parameter in order to generate the optimum molding conditions, whereby molding conditions for mass production are obtained. Thus, Japanese Patent No. 5709328 is premised on the generation of the optimum molding conditions by the resin flow analysis.

If the resin flow analysis is used for a product design, the molding conditions, a product structure, and a mold structure are optimized such that molded article quality predicted from the analysis result satisfies requirement specifications. However, the resin flow analysis acquires merely theoretical optimum conditions. The resin flow analysis causes a prediction error between actual molding and the theoretical optimum conditions due to the accuracy of the property database of a material for use, a physical model for use, and a difference specific to each molding machine (a difference between machines), with the difference not appearing as a mechanical parameter in a catalogue.

This is because even if injection molding machines are manufactured in the same design, each of the machines actually has a small machine-specific difference that affects the behavior of resin.

Thus, it is not easy to determine the optimum molding conditions in mass production only by the resin flow analysis described in Japanese Patent No. 5709328. Even if it seems that an optimum value has been found, the value may be different from an optimum value in actual molding. In reality, it is necessary to adjust molding conditions in mass production while confirming actually obtained molded article quality, with reference to the optimum molding conditions obtained in the resin flow analysis. The adjustment of the molding conditions is necessary also when a mold, which has a track record in mass production in a molding machine, is used for molding in another molding machine, as there is a machine difference between the machines.

Since Japanese Patent No. 3613764 does not take into account a molding machine-specific difference similarly to Japanese Patent No. 5709328, molded articles which have the same quality cannot be obtained only by simply converting the molding conditions of a molding machine into those of another molding machine.

The present invention has been made in view of the problem. An object of the present invention is to provide an injection molding system, a molding condition correction system, and an injection molding method that can improve the quality of injection molding.

In order to solve the problem, an injection molding system according to the present invention includes one or more computers each including a microprocessor and a storage device, the system including: the step of determining a manufacturing condition including a combination of a first mold and a first injection molding machine; confirming presence or absence of a first track record in production in which a combination of the first mold and the first injection molding machine is used, by searching a production-track-record storage unit; and producing, in a case of the absence of the first track record in production, a corrected molding condition for injection molding by using a combination of the first injection molding machine and the first mold, based on first molding machine-specific information acquired in advance for the first injection molding machine, second molding machine-specific information acquired in advance for a second injection molding machine that is combined with the first mold and has a second track record in production, and the second track record in production acquired from the production-track-record storage unit. In the step of producing the corrected molding condition, at least an amount of resin injected from the first injection molding machine into the first mold is corrected, and the produced corrected molding condition is inputted to the first injection molding machine.

According to the present invention, even in a case of the absence of the first track record in production with a combination of the first mold and the first injection molding machine, a corrected molding condition for injection molding having a combination of the first mold and the first injection molding machine can be produced in the presence of the second track record in production having a combination of the first mold and the second injection molding machine, based on the first molding machine-specific information on the first injection molding machine, the second molding machine-specific information on the second injection molding machine, and the second track record in production, and the produced corrected molding condition can be inputted to the first injection molding machine.

BRIEF DESCRIPTION OF THE DRAWINGS

FIG. 1 is a functional block diagram of an injection molding system;

FIG. 2 is an explanatory drawing illustrating a hardware configuration and a software configuration of a computer usable for implementing the injection molding system;

FIG. 3 is a cross-sectional view illustrating the configuration of an injection molding machine;

FIG. 4 is a flowchart of an injection molding method;

FIG. 5 is an explanatory drawing illustrating the outline of an experiment for verifying the effect of the present embodiment;

FIG. 6 is a block diagram indicating a method of acquiring molding machine-specific information;

FIG. 7 is a graph showing that the relationship between a set value of a dwell pressure and a peak pressure varies between molding machines;

FIG. 8 is a graph showing that the relationship between a resin temperature and a peak resin temperature varies between the molding machines;

FIG. 9 is a graph showing a change in mold opening amount with respect to time;

FIG. 10 is a graph showing the relationship between a set value of a dwell pressure and a remaining mold opening amount;

FIG. 11 is a flowchart of processing for generating corrected molding conditions;

FIG. 12 is a table showing the correlation between a feature amount of a physical quantity obtained from a mold sensor and molding conditions to be corrected;

FIG. 13 is an explanatory drawing illustrating the computer configuration of an injection molding system according to Embodiment 2;

FIG. 14 is an explanatory drawing illustrating the computer configuration of an injection molding system according to Embodiment 3;

FIG. 15 is a functional block diagram of an injection molding system according to Embodiment 4;

FIG. 16 is an explanatory drawing illustrating a hardware configuration and a software configuration of a computer usable for implementing the injection molding system;

FIG. 17 is a block diagram indicating a method of acquiring molding machine-specific information;

FIG. 18 is a flowchart indicating a method of correcting injection-point boundary conditions;

FIG. 19 is a block diagram indicating a method of acquiring molding machine-specific information according to Embodiment 5;

FIG. 20 is a graph indicating the results of an experimental value of a maximum mold opening amount and a regression analysis by a surface polynomial model with respect to a set clamping force and an applied load;

FIG. 21 is a flowchart indicating the detail of step S61 in FIG. 11;

FIG. 22 is a functional block diagram of an injection molding system according to Embodiment 6;

FIG. 23 is a schematic diagram indicating a method of producing a database for a measuring step and a method of correcting the measuring step;

FIG. 24 is a characteristic diagram of the relationship between an injection volume and a cylinder extrusion amount;

FIG. 25 is a block diagram indicating a method of collecting a correction value (regression coefficient) for correcting information on the measuring step, that is, part of molding machine-specific information; and FIG. 26 is an explanatory drawing indicating an example of a method of correcting a parameter for the measuring step.

DETAILED DESCRIPTION OF THE EMBODIMENT

Embodiments of the present invention will be described below in accordance with the accompanying drawings. The present embodiment includes: determining a first mold and a first injection molding machine as manufacturing conditions; determining the presence or absence of a track record in production with the first mold; determining the presence or absence of a track record in production with a combination of the first mold and the first injection molding machine; and producing corrected molding conditions for implementing injection molding with a combination of the first mold and the first injection molding machine based on first molding machine-specific information obtained in advance for the first injection molding machine, second molding machine-specific information obtained in advance for a second injection molding machine with a track record in production with the first mold, and a track record in production with a combination of the first mold and the second injection molding machine, in the presence of the track record in production with the first mold and in the absence of the track record in production with a combination of the first mold and the first injection molding machine. The produced corrected molding conditions are inputted to the first injection molding machine, and then injection molding is performed.

According to the present embodiment, if a mold with a track record in mass production with a certain injection molding machine is used for molding with another injection molding machine, proper molding conditions can be obtained based on the track record in the mass production of conforming articles and acquired molding machine-specific information.

Specifically, according to the present embodiment, if a mold with a track record in production (or mass production) with a certain injection molding machine is used for molding with another injection molding machine, a satisfactory injection molded product is obtained by correcting injection conditions based on the track record and the obtained molding machine-specific information.

According to the present embodiment, as the molding machine-specific information, a physical quantity corresponding to a machine difference specific to the injection molding machine is obtained in advance and is stored in association with the injection molding machine. According to the present embodiment, the presence or absence of a track record in production with a certain mold and the injection molding machine is determined. In the absence of a track record in production, corrected molding conditions are generated from a track record in production and obtained molding machine-specific information. In an injection molding method according to the present embodiment, injection molding can be implemented with a combination of a mold and an injection molding machine, which are defined by manufacturing conditions, by using corrected molding conditions.

Thus, according to the present embodiment, if a mold with a track record in production with a certain injection molding machine is used for molding with another injection molding machine, more proper injection molding conditions can be obtained than in the related art based on a track record in the production of conforming articles and obtained molding machine-specific information. This eliminates the need for a condition setting by a skilled operator when a mold produced at a certain location is moved to another location for production, thereby shortening a production lead time and improving part quality.

In the present embodiment, a mold opening amount, a speed, a pressure, a temperature, and a volume of resin (resin amount) injected into a mold will be described as examples of a physical quantity for injection molding. The physical quantity may be a predetermined value or a curve (characteristic line) indicating a change of a value with respect to time.

The step of producing the corrected molding conditions of the present embodiment corrects at least an amount of resin injected from the first injection molding machine to the first mold, and the produced corrected molding conditions are inputted to the first injection molding machine.

The molding machine-specific information may indicate the relationship between a theoretical value and a measured value when resin is injected into the mold attached to the injection molding machine under predetermined injection conditions.

The predetermined injection conditions may include the alignment of a screw position at the end of a dwelling step and a screw position (VP switching position) for switching injection and dwelling.

The molding machine-specific information may include information in which an extrusion distance from a measurement position to a VP switching position, the screw diameter of the injection molding machine, and the volume of an obtained molded article are associated with one another in injection molding performed by inputting molding conditions to the injection molding machine, the molding conditions including changes of a screw position at the end of the dwelling step, a screw position for switching injection and dwelling (VP switching position), and a measurement position in a range where the dwelling step is set at 0 seconds in an unloaded state.

The step of producing the corrected molding conditions may include producing the corrected molding conditions by correcting the measurement position, a speed switching position, and the VP switching position with a predetermined transformation based on first molding machine-specific information, second molding machine-specific information, and a second track record in production.

Embodiment 1

Referring to FIGS. 1 to 12, Embodiment 1 will be described below. FIG. 1 is a functional block diagram of an injection molding system (or an injection molding method) 1.

The injection molding system 1 includes, for example, a production management system 2, a manufacturing system 3, a molding condition correction system 4, and a factory 5.

Some or all of functions constituting the injection molding system 1 may be configured as software or cooperation between software and hardware. At least some of the functions may be implemented using hardware that can change a part of a circuit. At least some of the functions of the production management system 2, the manufacturing system 3, and the factory 5 may be manually performed by an operator.

The production management system 2 is a system for managing production planning and includes at least a production planning management unit 21. The production planning management unit 21 has the function of generating production planning including production specifications, quantities, and periods according to an order status and a stock status.

The manufacturing system 3 is a system for instructing the factory 5 to execute manufacturing operations. The manufacturing system 3 determines manufacturing conditions and molding conditions based on the production planning generated by the production management system 2 and sends the factory 5 a production instruction including the manufacturing conditions and the molding conditions. The manufacturing conditions include, for example, information for specifying an injection molding machine used for production (injection molding), information for specifying a mold used for production, information for specifying a material used for production, the number of molded articles to be produced, and a production period.

The manufacturing system 3 will be described below. The manufacturing system 3 includes, for example, a manufacturing condition determination unit 31, a production-track-record storage unit 32, a production-track-record acquisition unit 33, a manufacturing instruction unit 34, a corrected-molding-condition acquisition unit 35, and a production-track-record learning unit 36.

The manufacturing condition determination unit 31 has the function of determining the manufacturing conditions based on production planning generated by the production planning management unit 21 of the production management system 2. The manufacturing condition determination unit 31 can transmit information on the manufacturing conditions to the molding condition correction system 4. The information on the manufacturing conditions may include predetermined information on a first mold and a first injection molding machine. The predetermined information includes, for example, the capacity of the first mold and the runner configuration of the first mold. The predetermined information may further include, for example, the control mode (e.g., PID (Proportional-Integral-Differential) or a set value) of the first injection molding machine. The manufacturing condition determination unit 31 may transmit CAD (Computer Aided Design) data on the first mold and one or both of specification data and setting data on the first injection molding machine as "predetermined information" to the molding condition correction system 4. The molding condition correction system 4 stores the information received from the manufacturing condition determination unit 31, in molding machine-specific information 41.

The production-track-record storage unit 32 has the function of storing actual production. In the present embodiment, a track record in production means molding conditions for confirming the acquisition of high part quality with a combination of an injection molding machine and a mold.

The production-track-record acquisition unit 33 has the function of acquiring a track record in production from the production-track-record storage unit 32. The production-track-record acquisition unit 33 reads and acquires, from the production-track-record storage unit 32, a track record in production with a mold (hereinafter will be referred to as a first mold) determined by the manufacturing condition determination unit 31 and a track record in production with a combination of the first mold and the injection molding machine (hereinafter will be referred to as a first injection molding machine) determined by the manufacturing condition determination unit 31.

In the absence of a track record in production with the first mold, the production-track-record acquisition unit 33 requests molding conditions from the manufacturing instruction unit 34. The request for molding conditions means an instruction to search for proper molding conditions in the factory 5. The factory 5 searches for proper molding conditions according to the inputted manufacturing conditions while changing various parameters.

In the presence of a track record in production with a combination of the first injection molding machine and the first mold, the production-track-record acquisition unit 33 outputs the track record acquired from the production-track-record storage unit 32, to the manufacturing instruction unit 34. In the presence of a track record in production with the first mold but in the absence of a track record in production with a combination of the first injection molding machine and the first mold, the production-track-record acquisition unit 33 instructs the corrected-molding-condition acquisition unit 35 to acquire corrected molding conditions.

The corrected-molding-condition acquisition unit 35 has the function of acquiring, from the molding condition correction system 4, corrected molding conditions with a combination of the first mold and the first injection molding machine that are determined by the manufacturing condition determination unit 31.

The corrected-molding-condition acquisition unit 35 has the function of requesting the generation of corrected molding conditions from the molding condition correction system 4 and acquiring the corrected molding conditions generated by the molding condition correction system 4. The corrected-molding-condition acquisition unit 35 transmits basic information necessary for producing corrected molding conditions, to the molding condition correction system 4, thereby acquiring corrected molding conditions from the molding condition correction system 4.

The basic information necessary for producing the corrected molding conditions includes, for example, the first injection molding machine and the first mold that are determined by the manufacturing condition determination unit 31, another injection molding machine (hereinafter will be referred to as a second injection molding machine) with a track record in production with the first mold, and a track record in production (second production track record) with a combination of the second injection molding machine and the first mold.

When acquiring the corrected molding conditions from the molding condition correction system 4, the corrected-molding-condition acquisition unit 35 outputs the acquired corrected molding conditions to the manufacturing instruction unit 34.

The manufacturing instruction unit 34 has the function of instructing the factory 5 to execute manufacturing operations.

The execution of the manufacturing operations may be also referred to as production. The instruction to execute the manufacturing operations includes, for example, a molding condition request or a track record in production from the production-track-record acquisition unit 33, any one of the corrected molding conditions acquired by the corrected-molding-condition acquisition unit 35, and the manufacturing conditions determined by the manufacturing condition determination unit 31.

The production-track-record learning unit 36 has the function of recording, in the production-track-record storage unit 32, the molding conditions for confirming the acquisition of high part quality in the factory 5. The production-track-record learning unit 36 registers molding conditions for obtaining quality equal to or higher than a predetermined level, in the production-track-record storage unit 32 based on information about the quality results of molded articles from a quality inspection unit 53 of the factory 5.

The molding condition correction system 4 will be described below. The molding condition correction system 4 has the function of correcting the molding conditions based on the track record inputted from the manufacturing system 3 and the obtained molding machine-specific information. The molding conditions having undergone the correction will be referred to as corrected molding conditions.

The molding machine-specific information of the present embodiment is information specific to each injection molding machine and includes a machine difference specific to the injection molding machine as well as the model number and specifications of the injection molding machine.

A machine difference in the present embodiment means, for example, a difference between inputted molding conditions and a physical quantity at a predetermined position in the mold when the same molding conditions are inputted to the injection molding machines.

The predetermined position in the mold is, for example, the resin inlet of the mold. The physical quantity includes, for example, a resin pressure, a resin temperature, a resin speed, the material properties of resin, and the opening amount of the mold (mold opening amount). The material properties include, for example, a resin density, a resin viscosity, and the distribution of fiber lengths of resin (a material containing reinforcement fibers). It is assumed that a machine difference is caused by a difference in the control algorithm (a control mode, a set value) of pressure control or temperature control and the like and a difference between incidental facilities such as a mold temperature regulator, which is not illustrated, in addition to a difference in the configuration of an injection molding machine 50 that will be described later with reference to FIG. 3.

The molding condition correction system 4 will be described below. The molding condition correction system 4 includes, for example, a molding machine-specific information storage unit 41, a molding machine-specific information acquisition unit 42, a molding condition correction unit 43, and a molding machine-specific information learning unit 44.

The molding machine-specific information storage unit 41 has the function of storing molding machine-specific information obtained in advance for each injection molding machine.

The molding machine-specific information acquisition unit 42 has the function of acquiring, for example, molding machine-specific information on the injection molding machine specified by the manufacturing system 3, from the molding machine-specific information storage unit 41. The molding machine-specific information acquisition unit 42 acquires molding machine-specific information on the first injection molding machine (first molding machine-specific information) and molding machine-specific information on the second injection molding machine (second molding machine-specific information) from the corrected-molding-condition acquisition unit 35 of the manufacturing system 3, and outputs the acquired molding machine-specific information to the molding condition correction unit 43. The molding machine-specific information acquisition unit 42 may also receive the track record, which is acquired from the production-track-record storage unit 32 by the production-track-record acquisition unit 33, via the corrected-molding-condition acquisition unit 35, and transfer the received track record to the molding condition correction unit 43.

The molding condition correction unit 43 has the function of correcting the molding conditions based on information inputted from the molding machine-specific information acquisition unit 42. The molding condition correction unit 43 has the function of generating corrected molding conditions by correcting molding conditions based on the first molding machine-specific information, the second molding machine-specific information, and a track record in production with a combination of the second injection molding machine and the first mold, the molding machine-specific information being inputted from the molding machine-specific information acquisition unit 42. The molding condition correction unit 43 transmits the generated corrected molding conditions to the corrected-molding-condition acquisition unit 35 of the manufacturing system 3.

The molding machine-specific information learning unit 44 has the function of extracting a feature amount of a physical quantity based on data (sensing data) from a sensor 57 provided in an injection molding machine 50 or the mold and storing the feature amount as machine difference information in the molding machine-specific information storage unit 41. Specifically, the molding machine-specific information learning unit 44 extracts a feature amount from sensing data in injection molding processes 54 to 56 obtained from the factory 5 and stores the extracted feature amount as machine difference information in the molding machine-specific information storage unit 41.

The factory 5 will be described below. The factory 5 executes one or a plurality of the injection molding processes 54 to 56 in response to a manufacturing instruction from the manufacturing system 3. In FIG. 1, injection molding may be abbreviated as "IM".

The factory 5 includes, for example, a manufacturing unit 51, the multiple injection molding machines 50 (will be described later with reference to FIG. 3), a plurality of molds (will be described later with reference to FIG. 3), a molding condition producing unit 52, and the part quality inspection unit 53. Hereinafter the part quality inspection unit 53 may be abbreviated as the quality inspection unit 53.

The manufacturing unit 51 executes the injection molding processes according to the manufacturing conditions inputted from the manufacturing instruction unit 34 of the manufacturing system 3. When the corrected molding conditions are inputted, the manufacturing unit 51 executes the injection molding process 54 by inputting the corrected molding conditions according to a combination of the injection molding machine and the mold that are indicted in the manufacturing conditions. In other words, the injection molding process 54 is a process for injection molding based on the corrected molding conditions.

When a track record in production is inputted, the manufacturing unit 51 executes the injection molding process 55 by inputting the track record in production according to a combination of the indicated injection molding machine and mold. In other words, the injection molding process 55 is an injection molding process performed by using the combination of the specified injection molding machine and mold under molding conditions with a track record in the production of conforming articles.

When a molding condition request is inputted, the manufacturing unit 51 instructs the molding condition producing unit 52 to derive molding conditions. When receiving the molding condition request from the manufacturing unit 51, the molding condition producing unit 52 derives optimum molding conditions for stably obtaining conforming articles. When the molding conditions are derived, a resin flow is analyzed in advance to roughly estimate molding conditions. This shortens a time for deriving the molding conditions. If it is confirmed in the quality inspection unit 53 that conforming articles can be obtained under the derived molding conditions, the derived optimum molding conditions are inputted to execute the injection molding process 56. In other words, the injection molding process 56 is a process for deriving molding conditions and performing injection molding based on the derived molding conditions.

The quality inspection unit 53 has the function of determining whether part quality obtained in the injection molding process is high or low. The part quality is evaluated based on, for example, dimensions, an amount of warp, a burr, a scratch, a shine, and a color. The part quality may be automatically inspected, manually inspected by an inspector, or semiautomatically inspected.

In the case of high part quality, the quality inspection unit 53 outputs the manufacturing conditions, the combination of the injection molding machine and the mold, the molding conditions, and the inspection results of the part quality to the production-track-record learning unit 36 of the manufacturing system 3.

The molding machine-specific information according to the present embodiment is acquired by measuring a physical amount at a predetermined position in the mold by means of the sensor 57 mounted in each of the injection molding machines and the mold in the factory 5 and the mold, and outputting the physical amount to the molding condition correction system 4.

FIG. 2 illustrates a configuration example of a computer 10 usable for implementing the injection molding system 1 of the present embodiment. In the present embodiment, the injection molding system 1 is implemented by the single computer 10, but not limited thereto, multiple computers may be combined to construct one or a plurality of injection molding systems 1. As described above, the injection molding system 1 can be also implemented by performing some or all of the functions of the production management system 2, the manufacturing system 3, and the factory 5 by an operator without using special software or hardware.

As will be described in other embodiments, the molding condition correction system 4 may be constructed as software on a cloud server and shared among multiple users. In this case, molding machine-specific information recorded in the molding machine-specific information storage unit 41 can be shared among the users. The larger the number of users, the higher the frequency of obtaining corrected molding conditions by using molding machine-specific information acquired by other users. This can reduce the number of steps of acquiring the molding machine-specific information.

The computer 10 includes, for example, an arithmetic unit 11, a memory 12, a storage device 13, an input apparatus 14, an output apparatus 15, a communication apparatus 16, and a medium interface unit 17. The units, device, and apparatuses 11 to 17 are coupled to one another via a communication channel CN1. The communication channel CN1 is, for example, an internal bus or a LAN (Local Area Network).

The arithmetic unit 11 includes, for example, a microcomputer. The arithmetic unit 11 reads computer programs, which are stored in the storage device 13, into the memory 12 and executes the programs so as to implement functions 21, 31 to 36, 41 to 44, 51, 52, and 60 as the injection molding system 1.

The storage device 13 is a device for storing the computer programs and data. The storage device 13 includes, for example, rewritable storage media such as a flash memory and a hard disk. In the storage device 13, a computer program for implementing a GUI unit 70 that provides a GUI (Graphical User Interface) for the operator and a computer program for implementing the functions 21, 31 to 36, 41 to 43, 51, and 52 are stored.

The input apparatus 14 is an apparatus for inputting information to the computer 10 by the operator. The input apparatus 14 is, for example, a keyboard, a touch panel, a pointing device such as a mouse, or a voice command device (any one of the devices is not illustrated). The output apparatus 15 is an apparatus for outputting information from the computer 10. The output apparatus 15 is, for example, a display, a printer, or a voice synthesizer (any one of the devices is not illustrated).

The communication apparatus 16 is an apparatus for communications between an external information processor and the computer 10 via a communication channel CN2. As the external information processor, an external storage device 19 is available in addition to the computer that is not illustrated. The computer 10 can read data (including molding machine-specific information and a track record in production) and computer programs that are stored in the external storage device 19. The computer 10 can also transmit, to the external storage device 19, all or part of the computer programs and data that are stored in the storage device 13 and then store the programs and data in the external storage device 19.

The medium interface unit 17 is an apparatus for reading and writing in an external recording medium 18. The external recording medium 18 is, for example, a USB (Universal Serial Bus) memory, a memory card, or a hard disk. The computer programs and data can be also transferred from the external recording medium 18 to the storage device 13 and all or part of the computer programs and data that are stored in the storage device 13 can be also transferred to the external recording medium 18 and stored therein.

FIG. 3 schematically illustrates the injection molding machine 50. Referring to FIG. 3, the steps of an injection molding process will be described below. In the present embodiment, a molding phenomenon indicates a series of phenomena that occur in the injection molding process. In the present embodiment, the injection molding process is broadly divided into the step of measurement and plasticization, the step of injection and dwelling, the step of cooling, and the step of removal.

In the step of measurement and plasticization, a screw 502 is retracted by a plasticizing motor 501 acting as a driving force, so that resin pellets 504 are supplied from a hopper 503 into a cylinder 505. Subsequently, heat from a heater 506 and the rotation of the screw 502 plasticize resin into a uniform molten state. The density of molten resin and the degree of fracture of reinforcement fibers vary according to the back pressure and the number of revolutions of the screw 502. These changes affect part quality.

In the step of injection and dwelling, the screw 502 moved ahead by an ejection motor 507 acting as a driving force, so that the molten resin is injected into a mold 509 through a nozzle 508. The molten resin injected into the mold 509 is simultaneously subjected to cooling from the wall surface of the mold 509 and shearing heat generation caused by a flow. In other words, the molten resin flows into the cavity of the mold 509 while being cooled and heated.

After the molten resin is charged into the mold 509, resin is supplied into the mold 509 by a dwell pressure according to a volume reduction during cooling of the molten resin. If a clamping force for closing the mold 509 is small relative to a pressure during injection and a pressure during dwelling, the mold slightly opens after the molten resin is solidified. The part quality is affected by a small gap of the mold.

In the step of cooling, the molten resin is cooled to a solidifying point or less by the mold 509 kept at a constant temperature. A residual stress generated in the step of cooling affects the part quality. The residual stress is generated with the anisotropy of material properties due to a flow in the mold, a density distribution caused by a dwell pressure, and irregularities in mold shrinkage factors.

In the step of removal, a clamping mechanism 512 is driven by a motor 511 acting as a driving force for opening and closing the mold 509, so that the mold 509 is opened. Subsequently, an ejector mechanism 514 is driven by an ejection motor 513 acting as a driving force, so that the solidified part is removed from the mold 509. The mold 509 is then closed for a subsequent shot. If a sufficient ejection force is not evenly applied to the part when the part is removed from the mold 509, a residual stress is left on the part and affects the part quality.

In the injection molding machine 50, pressure control is performed such that a pressure value determined by a load cell 510 approaches a pressure value under inputted molding conditions. The temperature of the cylinder 505 is controlled by a plurality of heaters 506. A different pressure loss is produced for each injection molding machine depending upon the shape of the screw 502, the shape of the cylinder 505, and the shape of the nozzle 508. Thus, a pressure at the resin inlet of the mold 509 is lower than a pressure indicated by the molding conditions inputted to the injection molding machine. Moreover, because of the layout of the heaters 506 and the shearing heat generation of resin in a nozzle part, a resin temperature at the resin inlet of the mold 509 may be different from a resin temperature indicated by the molding conditions inputted to the injection molding machine. The configuration of the injection mechanism (including the shape of the screw 502, the shape of the cylinder 505, the shape of the nozzle 508, and the layout of the heaters 506) varies among injection molding machines. Therefore, the molding conditions are corrected to have an equal physical quantity of molten resin at the resin inlet of the mold 509, achieving uniform part quality even if different injection molding machines are used.

The part quality is evaluated by shape characteristics (including a weight, a length, a thickness, a shrink mark, a burr, and a warp), surface characteristics such as poor appearances (including a weld, silver, burning, bleaching, scratches, air bubbles, exfoliation, a flow mark, jetting, and a color/shine), and mechanical and optical properties (including tensile strength and impact resistance).

The shape characteristics are highly associated with the history of a pressure and a temperature and a clamping force in the step of injection and dwelling and the step of cooling.

The surface characteristics are caused by different factors depending on occurring phenomena. For example, a flow mark and jetting are highly associated with a temperature and speed of resin in the step of injection. Regarding the mechanical and optical properties, for example, tensile strength requires an evaluation by destructive testing and thus the properties are frequently evaluated by other associated quality indexes such as a weight.

In the molding conditions, a parameter is configured for each step of the injection molding process. In the step of measurement and plasticization, a measurement position, a suck-back, a back pressure, a back pressure speed, and the number of revolutions are configured. In the step of injection and dwelling, a pressure, a temperature, a time, and a speed are configured. In the step of injection and dwelling, a screw position (VP switching position) for switching injection and dwelling and a clamping force of the mold 509 are also configured. In the step of cooling, a cooling time after dwelling is configured. As temperature parameters, for example, temperatures of the heaters 506 and a temperature and a flow rate of a refrigerant for cooling the mold 509 are configured.

FIG. 4 is a flowchart indicating an example of the injection molding method performed by the injection molding system 1.

In FIG. 4, the injection molding machine is abbreviated as a molding machine. Furthermore, the first mold is denoted as a determined mold while the first injection molding machine is denoted as a determined molding machine in FIG. 4.

The production management system 2 acquires, for example, an order status and a stock status as information for determining production planning, from the production planning management unit 21 implemented by the GUI unit 70 (S1). For example, an operator determines optimum production specifications, quantities, and periods and generates production planning according to the order status and the stock status that are displayed on the GUI (S1). Alternatively, mathematical programming models and algorithms for optimizing the overall logistics may be introduced to automatically generate production planning.

The manufacturing system 3 acquires the production planning from the manufacturing condition determination unit 31 implemented by the GUI unit 70 and determines manufacturing conditions (S2). For example, the operator determines, for example, a combination of the optimum first injection molding machine and the optimum first mold according to the production planning and an operational status of the injection molding machine in the factory 5. Alternatively, mathematical programming models and algorithms for optimizing production efficiency may be introduced to automatically determine manufacturing conditions.

The production-track-record acquisition unit 33 determines the presence or absence of a track record in production with reference to a track record in production with the first mold determined in step S2, the track record being recorded in the production-track-record storage unit 32 (S3). In the absence of a track record in production with the first mold (S3: NO), the production-track-record acquisition unit 33 outputs a molding condition request to the manufacturing instruction unit 34 (S4). In the presence of a production track record in production with the first mold (S3: YES), the process advances to step S5.

When receiving the molding condition request from the production-track-record acquisition unit 33, the manufacturing instruction unit 34 instructs the factory 5 to derive molding conditions (S4). For example, in the molding condition producing unit 52, the operator confirms the instruction to derive molding conditions from the manufacturing unit 51 implemented by the GUI unit 70. The operator then performs the injection molding process with a combination of the first injection molding machine and the first mold, thereby deriving optimum molding conditions for stably obtaining conforming articles (S4). In step S4, theoretically optimum molding conditions are derived in advance by resin flow analysis, thereby reducing the number of repetitions (the number of trials and errors) of the injection molding process for deriving the molding conditions.

The production-track-record acquisition unit 33 determines the presence or absence of a track record in production with reference to a track record in production with the first injection molding machine and the first mold that are determined in step S2, the track record being recorded in the production-track-record storage unit 32 (S5). In the presence of a track record in production with a combination of the first injection molding machine and the first mold (S5: YES), the production-track-record acquisition unit 33 outputs the acquired track record to the manufacturing instruction unit 34 (S7). In the absence of a track record in production with a combination of the first injection molding machine and the first mold (S5: NO), the production-track-record acquisition unit 33 instructs the corrected-molding-condition acquisition unit 35 to acquire corrected molding conditions (S5).

The corrected-molding-condition acquisition unit 35 inputs the first molding injection molding machine determined by the manufacturing condition determination unit 31, the first mold, the second injection molding machine with a track record in production with the first mold, and a track record in production with a combination of the second injection molding machine and the first mold to the molding condition correction system 4 and causes the molding condition correction system 4 to produce corrected molding conditions (S6). The corrected-molding-condition acquisition unit 35 outputs the produced corrected molding conditions to the manufacturing instruction unit 34 (S6).

The manufacturing system 3 outputs a manufacturing instruction to the factory 5 from the manufacturing instruction unit 34 implemented by the GUI unit 70, the manufacturing instruction including the manufacturing conditions determined in step S2 and the production track record inputted in step S5 or the corrected molding conditions inputted in step S6 (S7).

For example, the operator confirms the determined manufacturing conditions and the track record in production or the corrected molding conditions. Without any problems in the contents, the operator can send a manufacturing instruction to the factory 5. Alternatively, the operator can provide molding conditions with a corrected machine difference without confirming the contents of the determined track record in production or the corrected molding conditions.

The operator confirms the contents of the manufacturing instruction through the manufacturing unit 51 implemented by the GUI unit 70 and causes the injection molding process to be executed according to the combination of the indicated injection molding machine and mold and the molding conditions (S7).

If high part quality is obtained by the injection molding process performed in step S4 or step S7, the part quality inspection unit 53 registers, for example, the manufacturing conditions, the combination of the injection molding machine and the mold, the molding conditions, and the inspection results of the part quality in the production-track-record learning unit 36 (S8). The GUI unit 70 may be used for registering information in the production-track-record learning unit 36. Thus, if a combination of the same injection molding machine and the same mold is determined as a manufacturing condition from the next time, manufacturing can be performed based on a track record in production in the production-track-record storage unit 32.

FIG. 5 illustrates the outline of experimental example 6 for examining the effect of the present embodiment. The upper part of FIG. 5 illustrates a status of an experiment. The lower part of FIG. 5 shows a table 65 of experimental results. Table 65 includes some of the input values of the molding conditions and evaluation results in the verification experiment.

A mold structure 60 in the upper part of FIG. 5 is a structure in which resin flows into a cavity from a sprue 61 according to a side-gate system of two points. In an actual molding experiment, a pressure sensor and a resin temperature sensor (the sensors are not illustrated) were disposed in a sensor installation part 62 of a runner. Furthermore, a mold position sensor (not illustrated) was disposed in a sensor installation part 64 at the center of a cavity 63.

In experimental example 6, a change of a pressure and a change of a temperature with respect to time in the cavity 63 were obtained as molding phenomena. Moreover, in experimental example 6, a change of a mold opening amount with respect to time was obtained.

From data obtained by experimental example 6, the peak value of the pressure sensor (a peak pressure in FIG. 5) and the peak value of the temperature sensor (a peak resin temperature in FIG. 5) were acquired as "feature amounts". As an index of part quality, the weight of the obtained part was measured. A material used for molding was polypropylene. The injection molding machine was a motor-driven injection molding machine (hereinafter will be referred to as a molding machine IMB) having a maximum clamping force of 55 t and a screw diameter of 25 mm and a motor-driven injection molding machine (hereinafter will be referred to as a molding machine IMA) having a maximum clamping force of 50 t and a screw diameter of 26 mm.

Three experiments were conducted in total, in which the same molding conditions were inputted to the molding machine IMA and the molding machine IMB or corrected molding conditions were produced and inputted for the molding machine IMB based on acquired molding machine-specific information.

Since a screw 602 of the molding machine IMA had a diameter different from the screw diameter of the molding machine IMB, the injection speeds to be inputted were converted with equal injection rates (the molding machine IMA had an injection speed of 32.4 mm/s while the molding machine IMB had an injection speed of 30 mm/s, and the molding machines had an injection rate of 17.2 cm3/s). A parameter for the step of measurement and plasticization was similarly converted and inputted.

Referring to the table 65 in the lower part of FIG. 5, the molding machine IMA and the molding machine IMB were compared with each other under the same inputted molding conditions. The molding machine IMB had a lower peak pressure and a lower peak resin temperature. When the corrected molding conditions were inputted to the molding machine IMA, as indicated by the right side of the table 65, the molding machine IMA and the molding machine IMB had substantially the same peak pressure and the same peak resin temperature after the correction. Accordingly, the weight error of parts obtained by the molding machine IMA and the molding machine IMB is reduced by 0.65% after the correction. This result was obtained by inputting the corrected molding conditions to the injection molding machine IMA, the molding conditions including a dwell pressure and a resin pressure that were corrected according to acquired molding machine-specific information.

FIG. 6 is a block diagram indicating an example of a method of acquiring molding machine-specific information on the injection molding machine. The method of acquiring the molding machine-specific information in FIG. 6 is implemented by using, as shown in FIG. 5, "a mold with an attached sensor" or "a mold with a built-in sensor" in which the sensor for measuring a predetermined physical quantity is provided at a predetermined position.

Any molding condition 701 is first inputted to an actual injection molding machine 702, thereby acquiring a physical quantity at a predetermined point in the mold. In this case, the injection molding machine 702 corresponds to the injection molding machine 50 illustrated in FIG. 3.

The molding condition 701 may not have to be one condition and may be multiple conditions. Physical quantities can be obtained under various molding conditions as long as a conforming article is obtained with high part quality.

A machine difference of the injection molding machine may vary according to the set value of a resin temperature or a dwell pressure and thus frequently become invalid even under the single molding condition. Under the molding condition 701, dwelling is preferably completed after gate sealing. This is because if a dwell time is insufficient and dwelling is completed before gate sealing, resin may flow backward from a gate part and reduce the packing density of a molded article. In this case, it is difficult to evaluate correlation with part quality.

In order to acquire a molding phenomenon in the actual injection molding machine 702, a molding-machine sensor 705 or a mold sensor 706 is used in a method. The load cell 510 in FIG. 3 is an example of the molding-machine sensor 705.

In the use of the molding-machine sensor 705, for example, an air shot is made for injection without the mold 703, and the output of the load cell 510 at that time is observed, allowing an indirect measurement of a pressure loss caused by the injection mechanism. Alternatively, a sensor is installed in the nozzle part and measures a state of resin immediately before the resin flows into the mold. If a resin temperature is measured, the temperature of resin obtained by an air shot may be directly measured by a thermometer or the like.

In the use of the mold sensor 706, the sensor is disposed at any position in a mold 703, allowing a direct measurement of a molding phenomenon in the mold 703 and acquisition of a measured value 708 of a physical quantity. The quality of a molded article 704 can be acquired by a product quality inspection 707.

A feature amount is acquired from the obtained physical quantity (709). The obtained physical quantities are both acquired as changes in the injection molding process with respect to time, so that it is difficult to directly evaluate the physical quantities. Thus, in the present embodiment, a feature amount that may affect part quality is acquired from a change of a physical quantity with respect to time. This achieves a quantitative evaluation of the machine difference of the injection molding machine 702.

In the present embodiment, the obtained feature amount and any first inputted molding condition are associated with each other and are recorded in a molding machine-specific information database 710. The molding machine-specific information database 710 corresponds to the molding machine-specific information storage unit 41 in FIG. 1.

Referring to FIGS. 7, 8, 9 and 10, the measurement results of the experimental example in FIG. 5 will be described below. FIGS. 7 and 8 show the measurement results of the mold structure 60 when the measured value of a physical quantity is acquired by using the mold sensor 706.

As described above, in this experiment, the peak value of the pressure sensor and the peak value of the resin temperature sensor were acquired in the sensor installation part 62 of the runner. "Molding machine IMA" indicated by diamond-shaped measurement points is an injection molding machine having a maximum clamping force of 50 t and a screw diameter of 26 mm. "Molding machine IMB" indicated by cross measurement points is an injection molding machine having a maximum clamping force of 55 t and a screw diameter of 25 mm. Experiments were conducted on the input values of multiple dwell pressures and resin temperatures.

FIG. 7 shows a peak pressure of the pressure sensor relative to a set value of a dwell pressure. As shown in FIG. 7, a peak pressure value falls below a set value of a dwell pressure due to a pressure loss caused by the injection mechanism. The two molding machines IMA and IMB have different inclinations of a set value of an obtained dwell pressure and a peak pressure. Thus, a pressure machine difference is preferably acquired under multiple molding conditions.

FIG. 8 shows a peak temperature of the resin temperature sensor relative to a set value of a resin temperature. As shown in FIG. 8, the molding machine IMA and the molding machine IMB had different peak temperature values relative to a set value because of a difference in injection mechanism. In this way, the measured value of a physical quantity is acquired by using the mold sensor 706, allowing a direct evaluation of a machine difference near the inlet of the mold. This can accurately determine the feature amount of a physical quantity necessary for deriving corrected molding conditions.

FIGS. 9 and 10 are graphs where an actual clamping force is insufficient even if a calculated necessary clamping force is configured as a molding condition. A mold 60M is used for an experiment as illustrated in FIG. 5. As illustrated in FIG. 5, the sensor installation part 64 of the mold 60M includes a mold position sensor (not illustrated) capable of measuring a change of a small mold opening amount with respect to time in an injection molding process. Molding is performed while a clamping force is measured as a parameter by the mold position sensor.

In FIG. 9, the mold structure 60 has a projection area of about 50 cm$^2$. A necessary clamping force F at this point is determined by, for example, Expression (1) below:

$$F=PA \quad \text{(Expression 1)}$$

where "F" is a necessary clamping force, "P" is a pressure in a cavity, and "A" is a projection area. The pressure in the cavity is a higher value of an injection pressure in the inputted molding conditions or a pressure in the step of dwelling. Alternatively, a pressure actually applied in the cavity is used in consideration of a pressure loss in the injection molding machine and a pressure loss at the sprue and a runner part in the mold. For example, a pressure value measured in the cavity may be used as indicated in FIG. 7.

A necessary clamping force calculated by Expression (1) is 30 t at a dwell pressure of 60 MPa. Therefore, a range under the conditions of FIG. 9 does not affect the part quality. However, at a dwell pressure of 50 MPa or more, the mold opening amount does not returns to the original position even in the step of cooling, and about 10 to 30 μm is left. In this case, the part quality is affected. For example, a molded article may have a burr or an excessive weight.

FIG. 9 shows a measured value of a mold opening amount when a dwell pressure is changed in the range of 20 to 60 MPa with a clamping force of 40 t. As shown in FIG. 9, a mold opening amount peaks in the step of injection and then the mold gradually returns to an original position in the step of dwelling. In the case of a sufficient clamping force, the mold opening amount naturally returns to the original position in the step of cooling.

FIG. 10 shows a remaining mold opening amount in the step of cooling when a dwell pressure is changed with a clamping force of 20 to 40 t. As shown in FIG. 10, a remaining mold opening amount varies with a clamping force. For example, at a dwell pressure of 40 MPa, the mold opening slightly remains with a clamping force of 20 t.

Since the injection molding machines have machine differences, high quality may not be kept only by configuring the calculated necessary clamping force in the molding conditions.

This is because a burr may actually occur due to an insufficient clamping force.

Thus, in the present embodiment, for the set value of the clamping force of the injection molding machine, an effective clamping force specific to the injection molding machine is experimentally determined so as to achieve molding with a sufficient clamping force. This enables the selection of corrected molding conditions with ensured part quality.

A method of deriving an effective clamping force specific to the injection molding machine will be described below. As shown in the example of FIG. 7, the threshold values of a clamping force and a pressure in the mold are derived from the output value of the mold position sensor provided on the mold parting face of the mold 60M.

Injection molding is performed by using, as a parameter, a pressure in the step of injection and dwelling, and then a change in mold opening amount with respect to time is recorded. Subsequently, as shown in FIGS. 9 and 10, a remaining mold opening amount is recorded in the step of cooling the mold.

A necessary clamping force (a force applied in the mold) relative to a set value of a dwell pressure is then calculated based on Expression (1). At this point, the minimum value of a dwell pressure is determined such that the remaining mold opening amount does not affect the part quality. A force applied in the mold at the minimum value of a dwell pressure is recorded as an effective clamping force specific to the injection molding machine, in the molding machine-specific information database 710.

At this point, the value of a clamping force is optionally changed before molding, thereby obtaining the relationship of the effective clamping force to the set value of a clamping force. This can configure a clamping force with more stable part quality than in the related art in consideration of slight mold opening that affects the part quality.

In this case, the force applied in the mold relative to the set value of a dwell pressure can be calculated from Expression (1) by using the set value of a dwell pressure. The force applied in the mold relative to the set value of a dwell pressure can be calculated also from Expression (2) by predicting a pressure applied to the mold by a flow analysis.

$$F=\Sigma PiAi \quad \text{(Expression 2)}$$

The subscript (variable) of the summation sign $\Sigma$ is "i". "i" denotes the number of segments determined by dividing a total projection area in an analysis model. "Pi" denotes a mean pressure of each segment. "Ai" denotes an area of each segment.

In molding for acquiring an effective clamping force, a pressure sensor may be introduced in the mold and the maximum value of a pressure may be actually acquired.

Thus, in consideration of a pressure actually applied to the mold, the necessary clamping force can be calculated from Expression (1). This can accurately configure an effective clamping force specific to the injection molding machine also according to Expression (1).

A part for measuring a physical quantity other than a mold opening amount in the mold (hereinafter will be referred to as a measurement part) will be described below. In each mold structure, the measurement part preferably includes at least a sprue part or a runner part that extends from the resin inlet into the cavity in the mold.

The cavity may contain the measurement part but when the molding machine-specific information is derived from the foregoing steps, it is necessary to consider a pressure loss from the resin inlet to the cavity. This requires the accuracy of analysis from the resin inlet to the inside of the cavity.

In the case of a measurement with the sensor in the cavity, the sensor shape may leave a mark on a molded article. Thus, in a place where a fine appearance is required, the introduction of the sensor is restricted.

Hence, in the present embodiment, the measurement part is set in the sprue part or the runner part that is located near the resin inlet and does not require a fine appearance, thereby easily determining molding machine-specific information with high accuracy.

In addition to the sprue part and the runner part, the measurement part may be a part where a characteristic flow is observable, for example, a part immediately below in the cavity, a resin joining part (weld part), or a flow end. In this case, molding machine-specific information can be more accurately determined from physical quantities obtained by multiple sensors.

For example, the flow rate of molten resin can be determined from the time points of passage of a flow front in multiple measurement parts, thereby deriving molding machine-specific information on the speed of molten resin. Furthermore, a measurement of a pressure and a temperature at that time can estimate the viscosity of molten resin in the mold, allowing a comparison with an analysis model.

Proper measurement parts vary among mold structures and physical quantities to be measured. In any mold structure, if possible, a sprue part preferably serves as a measurement part for a physical quantity other than a mold opening amount. "Preferably" herein merely means an expectation of an enhanced effect but does not mean that the configuration is essential.

If it is difficult to provide a sensor in the sprue part in the design of the mold, the sensor may be disposed in the runner part. In the case of a direct gate, a runner part is not provided and thus a part nearest the inside of a cavity is selected as a measurement part.

In a side gate, a jump gate, a submarine gate, and a banana gate, a sensor is disposed in, for example, a runner part immediately below a sprue part or a runner part in front of the gate. In the case of a pin gate, a three-plate structure is provided and thus requires a devised sensor layout. A sensor is disposed in, for example, a runner part immediately below a sprue part. In the case of a pin gate, a dummy runner uncoupled to a cavity may be provided for measurement and serve as a measurement part. The provision of the part for measurement increases flexibility in mold design. In the case of a film gate or a fan gate, a sensor is disposed in a runner part ahead of an inlet to a gate part.

A mold opening amount is preferably measured near the center of the cavity surface of the mold as indicated by, for example, the installation position 64 of the mold position sensor in FIG. 5. In the mold having an ejector mechanism, the central part is more susceptible to mold deformation caused by a resin pressure as compared with the peripheral part that directly receives a clamping force from the molding machine. Thus, the mold opening amount is likely to increase.

A parameter measured as the physical quantity will be described below. In the present embodiment, at least a mold opening amount, a pressure, and a temperature are measured in order to derive corrected molding conditions. For example, a mold position sensor, a mold pressure sensor, a mold-surface temperature sensor, or a resin temperature sensor is usable for measuring a mold opening amount, a pressure, and a temperature. As the resin temperature sensor, one or both of a contact temperature sensor, such as a thermocouple, and a noncontact temperature sensor, such as an infrared radiometer, may be used.

The physical quantities of a mold opening amount, a pressure, and a temperature are changes recorded in the injection molding process with respect to time. If a mold opening amount is not measured, the clamping force becomes insufficient due to a machine difference specific to the injection molding machine. This may affect a molding phenomenon and part quality. Even if corrected molding conditions are derived by using one of a pressure and a temperature as an evaluation criterion, the quality of an obtained molded article may vary when both parameters are different from set values as shown in FIG. 8. Hence, corrected molding conditions can be accurately determined by measuring at least a mold opening amount, a pressure, and a temperature.

The injection molding system 1 may acquire a flow-front speed or a time point of flow-front passage in addition to a mold opening amount, a temperature, and a pressure. From the sensor that detects the speed and passage of a flow front, information on time points of flow-front passage can be obtained instead of a change in the injection molding process with respect to time. If a time point of flow-front passage is acquired, at least two or more sensors are provided to compare two time points of passage of resin. The detection of the speed and time point of flow-front passage enables a more accurate evaluation of an injection speed.

The feature amount of the physical quantity will be described below. The derivation of corrected molding conditions of the present embodiment can use, for example, a mold opening amount after the step of cooling, a maximum value and an integral value of a pressure, and a maximum value of a temperature. The mold opening amount after the step of cooling is necessary for setting a clamping force without causing a small mold opening that affects part quality. The maximum value of a pressure is necessary for evaluating a pressure loss caused by the injection mechanism. However, even if only the maximum value of a pressure is matched to another, a difference in the change of a resin temperature with respect to time in the dwelling step may change a pressure distribution in the cavity and thus affect the part quality. Thus, corrected molding conditions can be accurately derived in consideration of the influence of a temperature change in the process by acquiring the integral value of a pressure in the injection molding process.

If corrected molding conditions are derived by using only a feature amount obtained from a pressure, for example, if corrected molding conditions are derived by changing a resin temperature, the molding phenomenon and part quality may be affected. Therefore, corrected molding conditions can be derived with high part quality by acquiring molding machine-specific information in consideration of the maximum value of a temperature in addition to a feature amount obtained from a pressure.

Additionally, it is also effective to acquire the maximum value of a time differential value relative to a change in pressure with respect to time. The feature amount is associated with the instantaneous viscosity of a material. The integral value of a pressure may be calculated separately for the injection step and the dwelling step. The integral value of a pressure in the injection step is associated with the mean viscosity of a material in the injection step.

If a resin temperature sensor of infrared radiation is used, the maximum value of a time differential value may be acquired relative to the output value of a change of the temperature sensor with respect to time in the injection step. The feature amount is associated with the flow-front speed of molten resin. Moreover, in a measurement of a flow-front speed, the speed is directly used as a feature amount associated with a flow rate. If a time point of flow-front passage is acquired, a flow rate is calculated from two time points of passage and is used as a feature amount. The injection speed can be more accurately corrected by recording the relationship of the set value of the injection speed to a flow rate.

Referring to FIGS. 11 and 12, a method of producing corrected molding conditions will be described below. FIG. 11 is a flowchart showing the detail of step S6 in FIG. 4. As described above, in step S6, the molding condition correction unit 43 generates corrected molding conditions with a combination of the first injection molding machine and the first mold by acquiring, from the molding machine-specific information acquisition unit 42, molding machine-specific information on the first injection molding machine, molding machine-specific information on the second injection molding machine, and a track record in production with a combination of the second injection molding machine and the first mold.

The molding condition correction unit 43 corrects a clamping force (S61). In step S61, for example, the set value of a clamping force of the second injection molding machine and the effective clamping force of the second injection molding machine according to the set value are referred from a track record in production. Furthermore, in step S61, the set value of a clamping force of the first injection molding machine is determined such that the effective clamping force of the first injection molding machine is equal to that of the second injection molding machine.

The molding condition correction unit 43 corrects a resin temperature (S62). In step S62, for example, the set value of a resin temperature of the second injection molding machine and a resin temperature at the mold inlet of the second injection molding machine according to the set value are referred from a track record in production as shown in FIG. 8. Furthermore, in step S62, the set value of a resin temperature of the first injection molding machine is determined such that a resin temperature at the mold inlet of the first injection molding machine is equal to that of the second injection molding machine.

The molding condition correction unit 43 corrects a mold temperature (S63). In step S63, for example, the set value of a refrigerant temperature and the set value of a flow rate in a mold temperature controller provided for the second injection molding machine and a mold temperature at the mold inlet of the second injection molding machine according to the set value are referred from a track record in production. Furthermore, in step S63, for example, the set value of a refrigerant temperature and the set value of a flow rate in a mold temperature controller provided for the first injection molding machine are determined such that the mold inlet of the first injection molding machine has a constant mold temperature.

The molding condition correction unit 43 corrects an injection speed and a dwelling speed. In step S64, the speeds are corrected by using Expressions (3) to (6) below:

$$ATA = (\pi \times \varphi A^2)/4 \quad \text{(Expression 3)}$$

$$ATB = (\pi \times \varphi B^2)/4 \quad \text{(Expression 4)}$$

$$VIA = VIB \times ATB/ATA \quad \text{(Expression 5)}$$

$$VHA = VHB \times ATB/ATA \quad \text{(Expression 6)}$$

where "ATA" indicates the cross-sectional area of the screw of the first injection molding machine. "ATB" indicates the cross-sectional area of the screw of the second injection molding machine. "φA" indicates the diameter of the screw of the first injection molding machine. "φB" indicates the diameter of the screw of the second injection molding machine. "VIA" indicates the injection speed of the first injection molding machine. "VIB" indicates the injection speed of the second injection molding machine. "VHA" indicates the dwelling speed of the first injection molding machine. "VHB" indicates the dwelling speed of the second injection molding machine.

If the correlation between a set value of a speed and a measured value of a speed is obtained between the first injection molding machine and the second injection molding machine, the set value of a speed is additionally corrected to be equal to the measured value according to the foregoing steps.

The molding condition correction unit 43 corrects measurement conditions (S65). The measurement conditions include a measurement position, a VP switching position, and a screw speed. In step S65, corrections are made according to Expressions (7) to (12) below.

$$ATA = (\pi \times \varphi A^2)/4 \quad \text{(Expression 7)}$$

$$ATB = (\pi \times \varphi B^2)/4 \quad \text{(Expression 8)}$$

$$DA = DB \times ATB/ATA \quad \text{(Expression 9)}$$

$$DVP,A = DA + SA - (DB + SB - DVP,B) \times ATB/ATA \quad \text{(Expression 10)}$$

$$DVP,A = DA + SA - (DB + SB - DVP,B) \times ATB/ATA \quad \text{(Expression 11)}$$

$$nA = nB \times DB/DA \quad \text{(Expression 12)}$$

Expressions (7) and (8) are identical to Expression (3) and (4). "DA" indicates the measurement position of the first injection molding machine. "DB" indicates the measurement position of the second injection molding machine. "DVP,A" indicates the VP switching position of the first injection molding machine. "DVP,B" indicates the VP switching position of the second injection molding machine. "SA" indicates the suck-back amount of the first injection molding machine. "SB" indicates the suck-back amount of the second injection molding machine. "nA" indicates the screw speed of the first injection molding machine. "nB" indicates the screw speed of the second injection molding machine.

The molding condition correction unit 43 corrects a dwell pressure and a dwell time (S66). In step S66, for example, the set value of a pressure of the second injection molding machine and a pressure at the mold inlet of the second injection molding machine according to the set value are referred as shown in FIG. 8. The set value of a pressure of the first injection molding machine is determined such that a pressure at the mold inlet of the first injection molding machine is equal to that of the second injection molding machine.

According to the foregoing steps, the corrected molding conditions can be produced such that the first injection molding machine and the second injection molding machine have the same part quality. For example, if a clamping force is not corrected, the insufficient clamping force may cause burrs. If a pressure is corrected before a temperature, a change of a pressure in the mold with respect to time varies depending upon the temperature, leading to the acquisition of incorrect molding machine-specific information.

FIG. 12 is a table showing the correlation between a feature amount of a physical quantity obtained from the mold sensor and molding conditions to be corrected. In the table of FIG. 12, terms are abbreviated as follows: items horizontally arranged in the table are "Pmax" as a peak pressure, "PTmmax" as a peak mold temperature, "PTrmax" as a peak resin temperature, "diff Pmax" as a maximum differential value of a pressure, "diff Tmax" as a maximum differential value of a temperature, "int P@I" as an integral of a pressure in the injection step, and "int P@H" as an integral of a pressure in the dwelling step. Items vertically arranged in the table are "Thp" as a dwell time, "HP" as a dwell pressure, "IS" as an injection speed, "VP" as a VP switching position, "Tr" as a resin temperature, and "Tm" as a mold temperature.

In FIG. 12(1), the feature amounts of physical quantities were acquired in the mold structure 60 by the mold sensor under various molding conditions. FIG. 12(1) indicates the correlation between the molding conditions and the feature amounts.

Obtained feature amounts were a peak pressure, a peak mold temperature, a peak resin temperature, a maximum differential value of a pressure, a maximum differential value of a resin temperature, a pressure integral in the injection step, and a pressure integral in the dwelling step. "Low" indicates a correlation coefficient of less than 0.3 between the molding conditions and the feature amounts, "Middle" indicates a correlation coefficient of 0.3 or more and less than 0.7, and "High" indicates a correlation coefficient of 0.7 or more.

FIG. 12(1) indicates that each feature amount is highly correlated with the molding conditions. Thus, for example, even if only a pressure is corrected with reference to a peak pressure, different part quality is obtained unless other molding conditions are properly set. Since the molding conditions are correlated with one another, it is difficult to collectively determine all the molding conditions.

According to FIG. 12(1), a peak resin temperature indicates "High" only at a value corresponding to a resin temperature in the corrected molding conditions and indicates "Low" at the values of other corrected molding conditions. In other words, it is understood that a peak resin temperature is highly correlated only with a resin temperature. Thus, a resin temperature is first determined to have an equal peak resin temperature.

The determined resin temperature is excluded from the table as indicated in FIG. 12(2). As indicated in FIG. 12(2), a peak mold temperature is highly correlated only with a mold temperature. Thus, a mold temperature is similarly determined to have an equal peak mold temperature.

The determined mold temperature is excluded from the table as indicated in FIG. 12(3). As indicated in FIG. 12(3), a maximum differential value of a temperature is highly correlated only with an injection speed. Thus, an injection speed is similarly determined to have an equal maximum differential value of a temperature.

The determined injection speed is excluded from the table as indicated in FIG. 12(4). As indicated in FIG. 12(4), a maximum differential value of a pressure is highly correlated only with a VP switching position. Thus, a VP switching position is determined to have an equal maximum differential value of a pressure.

The determined VP switching position is excluded from the table as indicated in FIG. 12(5). As indicated in FIG. 12(5), a pressure integral in the injection step is highly correlated only with a dwell pressure. Thus, a dwell pressure is determined to have an equal pressure integral in the injection step. Furthermore, a dwell time is determined to have an equal pressure integral in the dwelling step.

As described above, the molding conditions uniquely defined by the foregoing steps are determined in stages, thereby obtaining corrected molding conditions in the shortest steps.

According to the present embodiment configured thus, if a mold with a track record in production with a certain injection molding machine is used for molding with another injection molding machine, optimum injection molding conditions for obtaining conforming articles can be achieved in a shorter time than in the related art without the need for skilled operators based on a track record in the production of conforming articles and obtained molding machine-specific information.

Furthermore, the present embodiment eliminates the need for considering a combination of the injection molding machine and the mold when optimizing a production schedule as a manufacturing condition. This can devise a more efficient production schedule.

Moreover, in the present embodiment, acquired molding machine-specific information is shared by multiple users. Hence, the larger the number of users, the higher the frequency of obtaining corrected molding conditions by using molding machine-specific information acquired by other users. This can considerably reduce the number of steps of acquiring the molding machine-specific information.

Embodiment 2

Referring to FIG. 13, Embodiment 2 will be described below. In the following embodiments including the present embodiment, differences from Embodiment 1 will be mainly described. In the present embodiment, a molding condition correction system 4 of an injection molding system 1 is provided in a computer 10A on a network CN2, and a production management system 2 and a manufacturing system 3 are managed by a computer 8 on a user (E/U) side where a factory 5 is provided. The computer 8 for the factory can obtain corrected molding conditions by transmitting predetermined information to the computer 10A including a molding condition correction system 4. As has been discussed, the predetermined information includes, for example, the capacity of a first mold and the runner configuration of the first mold. The predetermined information may also include, for example, the control mode (e.g., PID (Proportional-Integral-Differential) or a set value) of a first injection molding machine, CAD (Computer Aided Design) data on the first mold, and specification data and setting data on the first injection molding machine. The computer 8 for the factory is an example of "predetermined computer". The computer 10A is an example of "another predetermined computer".

The present embodiment configured thus can also achieve the same effects as Embodiment 1. Furthermore, according to the present embodiment, the computers 8 for multiple users can share the molding condition correction system 4 provided for the computer 10A. Therefore, in the present embodiment, the single molding condition correction system 4 can provide corrected molding conditions for the injection molding machines of factories.

Embodiment 3

Referring to FIG. 14, Embodiment 3 will be described below. In the present embodiment, the production management system 2, the manufacturing system 3, the molding condition correction system 4, and the factory 5 in FIG. 1 are implemented by computers 10(2), 10(3), 10(4), and 10(5), respectively, and are connected to one another via a communication network CN2.

The present embodiment configured thus can also achieve the same effects as Embodiment 1. In the present embodiment, the computers 10(2) to 10(5) are allocated to the respective systems 2 to 5. Thus, the computers 10(5) of factories in multiple places can be managed by using the production management system 2, the manufacturing system 3, and the molding condition correction system 4.

Embodiment 4

Referring to FIGS. 15 to 18, Embodiment 4 will be described below. FIG. 15 is a functional block diagram of an injection molding system (or an injection molding method) 1 according to the present embodiment. In the present embodiment, a molding condition correction system 4 includes a flow analysis unit 45 and an analysis-result storage unit 46 in addition to the foregoing functions 41 to 44.

FIG. 16 illustrates a configuration example of a computer 10 usable for implementing the injection molding system 1 of the present embodiment. In the storage device 13, computer programs for implementing the flow analysis unit 45 and the analysis-result storage unit 46 are also stored in addition to computer programs for implementing the functions 21, 31 to 36, 41 to 44, 51, 52, and 60.

In the present embodiment, a molding machine-specific information learning unit 44 extracts a measured value for a feature amount of a physical quantity based on data (sensing data) from a sensor 57 provided in an injection molding machine 50 or a mold. The molding machine-specific information learning unit 44 instructs the flow analysis unit 45 to perform an analysis and extracts an analytical value for the feature amount of a physical quantity based on an analysis result recorded in the analysis-result storage unit 46. Furthermore, the molding machine-specific information learning unit 44 determines whether the measured value and the analytical value of a feature amount agree with each other. If the values do not agree with each other, the molding machine-specific information learning unit 44 produces injection-point boundary conditions with corrected analysis conditions and instructs the flow analysis unit 45 to perform an analysis again. If the measured value and the analytical value of a feature amount agree with each other, the molding machine-specific information learning unit 44 stores the obtained injection-point boundary conditions as machine difference information in the molding machine-specific information storage unit 41.

FIG. 17 is a block diagram indicating an example of a method of acquiring molding machine-specific information on the injection molding machine according to the present embodiment. The method of acquiring the molding machine-specific information in FIG. 17 is implemented by using a combination of "a mold with an attached sensor" or "a mold with a built-in sensor", in which the sensor for measuring a predetermined physical quantity is provided at a predetermined position, and a flow analysis with a simulation of these mold structures.

In the foregoing steps, any molding condition 701 is first inputted to an actual injection molding machine 702, thereby acquiring the measured value of a physical quantity at a predetermined point in the mold (708). Thereafter, from an analysis result 712 obtained by inputting the molding condition 701 to a flow analysis 711, the analytical value of the physical quantity is acquired at the predetermined point in the mold (713). The flow analysis 711 corresponds to the processing of the flow analysis unit 45. The analysis result 712 is recorded in the analysis-result storage unit 46.

From the acquired measured value and analytical value of the physical quantity, a feature amount for comparing the measured value and the analytical value is acquired (714), and it is determined whether the measured value and the analytical value agree with each other (715). If the measured value and the analytical value do not agree with each other (715: NO), injection-point boundary conditions are generated by correcting the analysis conditions such that the feature amount of the analytical value agrees with the feature amount of the measured value (716). Processing from the flow analysis 711 to the generation of the injection-point boundary conditions 716 is repeatedly performed using the produced corrected molding conditions until the feature amount of the analytical value and the feature amount of the measured value agree with each other.

If the feature amount of the analytical value and the feature amount of the measured value agree with each other (715: YES), the obtained injection-point boundary conditions and any first inputted molding conditions are associated with each other and are recorded in a molding machine-specific information database 710. Furthermore, obtained feature amounts associated with one another may be registered in the molding machine-specific information database 710.

Referring to FIG. 18, a method of producing the injection-point boundary conditions will be described below. FIG. 18 is a flowchart showing the detail of step 716 in FIG. 17.

The molding machine-specific information learning unit 44 corrects a resin temperature (7161). In step 7161, the molding machine-specific information learning unit 44 configures the resin temperature of the injection-point boundary conditions such that the feature amount of a measured value and the feature amount of an analytical value agree with each other. The molding machine-specific information learning unit 44 performs an optimization calculation using a resin temperature as a variable such that a difference between the measured value and the analytical value is minimized with reference to, for example, the maximum value of a resin temperature from among obtained feature amounts.

The molding machine-specific information learning unit 44 corrects a mold temperature (7162). In step 7162, the molding machine-specific information learning unit 44 configures the mold temperature of the injection-point boundary conditions such that the feature amount of a measured value and the feature amount of an analytical value agree with each other. For example, the molding machine-specific information learning unit 44 performs an optimization calculation using, for example, a mold initial temperature, a refrigerant temperature, a refrigerant flow rate, and a room temperature as variables such that a difference between the measured value and the analytical value is minimized with reference to the maximum value of a resin temperature from among obtained feature amounts. Since these parameters are obtained as measured values, the calculation time can be shortened by initially inputting the measured values.

The molding machine-specific information learning unit 44 corrects an injection speed (7163). In step 7163, the injection speed of the injection-point boundary conditions is configured such that the feature amount of a measured value and the feature amount of an analytical value agree with each other. The molding machine-specific information learning unit 44 performs an optimization calculation using an injection speed as a variable such that a difference between the measured value and the analytical value is minimized with reference to, for example, the maximum differential value of a resin temperature from among obtained feature amounts. The molding machine-specific information learning unit 44 corrects measurement conditions (7164). In step 7164, the molding machine-specific information learning unit 44 configures the VP switching position of the injection-point boundary conditions such that the feature amount of a measured value and the feature amount of an analytical value agree with each other. The molding machine-specific information learning unit 44 performs an optimization calculation using a VP switching position as a variable such that a difference between the measured value and the analytical value is minimized with reference to, for example, the maximum differential value of a pressure from among obtained feature amounts.

The molding machine-specific information learning unit 44 corrects a dwell pressure and a dwell time (7165). In step 7165, the molding machine-specific information learning unit 44 configures the dwell pressure and the dwell time of the injection-point boundary conditions such that the feature amount of a measured value and the feature amount of an analytical value agree with each other. The molding machine-specific information learning unit 44 performs an optimization calculation using a dwell pressure and a dwell time as variables such that a difference between the measured value and the analytical value is minimized with reference to, for example, the maximum value and the integral value of a pressure from among obtained feature amounts.

According to the steps, the injection-point boundary conditions can be determined in a short time such that the feature amounts of a measured value and an analytical value of a physical quantity agree with each other at a predetermine point in the mold. For example, if a pressure is corrected before a temperature, a change of a pressure in the mold with respect to time varies depending upon the temperature. This requires another correction of the pressure after the temperature is corrected, increasing the calculation time. In the present embodiment, a temperature is first corrected, thereby calculating the injection-point boundary conditions in a short time.

The present embodiment configured thus can also achieve the same effects as Embodiment 1. According to the present embodiment, any location in the mold can be specified as a measurement part without being limited to the above-mentioned measurement part. Even if a sensor is installed in a sprue part or a runner part, a pressure at a resin inlet can be more accurately determined. Thus, in the present embodiment, the molding machine-specific information database 710 can be obtained using an existing mold in any shape. In the present embodiment, if a machine difference is corrected for another mold by using the obtained molding machine-specific information database 710, the machine difference can be more accurately corrected regardless of the structure of the mold. The present embodiment can construct the molding machine-specific information database 710 regardless of a track record in production in Embodiment 1.

Embodiment 5

Referring to FIGS. 19 to 21, Embodiment 5 will be described below. The inventors found that the maximum mold opening amount and the remaining mold opening amount in the foregoing experiments are correlated with the weight of a molded article and cause a machine difference between the molding machines. According to the finding, when a machine difference is corrected, mold opening amounts are caused to agree with each other relative to an applied load in a track record in production, thereby more accurately correcting the machine difference.

When a clamping force is corrected according to the present embodiment, a set clamping force, a necessary clamping force (a force applied in the mold), and a mold opening amount are associated with one another in addition to the effective clamping force and are registered in the molding machine-specific information database 710. FIG. 19 is a block diagram indicating an example of a method of acquiring molding machine-specific information on the injection molding machine according to the present embodiment.

In the foregoing steps, any molding condition 701 is first inputted to an actual injection molding machine 702, thereby acquiring the measured value of a physical quantity at a predetermined point in the mold (708). A feature amount is acquired from the obtained physical quantity (709). In the present embodiment, a peak pressure, a maximum mold opening amount, and a remaining mold opening amount are acquired as feature amounts.

Subsequently, a force applied in the mold (applied load) is calculated according to the obtained peak pressure and Expression (1) (717). Alternatively, a flow analysis may be performed to determine a pressure distribution in the mold, and an applied load may be calculated according to Expression (2).

Regarding the relationship of the maximum mold opening amount or the remaining mold opening amount with the obtained applied load and the molding condition 701, a regression analysis is performed on any model expression (718). The model expression may be, for example, a polynomial expression model of a surface.

FIG. 20 is a graph indicating the results of an experimental value of a maximum mold opening amount and a regression analysis by a polynomial model of a surface with respect to a set clamping force and an applied load in the present embodiment. For various set clamping forces and dwell pressures, fitting was satisfactorily achieved by the acquisition results of an applied load and a maximum mold opening amount and a cubic polynomial model of a surface according to Expression (13):

$$Z(A,B)=P00+P10 \times A+P01 \times B+P20 \times A^2+P11 \times A \times B+P02 \times B^2+P30 \times A^3+P21 \times A^2 \times B+P12 \times A \times B^2+P03 \times B^3 \quad \text{(Expression 13)}$$

where Z is a fitting function (maximum mold opening amount), A is a set clamping force, B is an applied load, P00, P10, P01, P20, P11, P02, P30, P21, P12, and P03 are fitting coefficients. By fitting an experimental value according to the regression of Expression (13) to determine the fitting coefficient, a maximum mold opening amount specific to the molding machine can be predicted relative to any set clamping force and an applied load.

The obtained set clamping force, applied load, and mold opening amount are associated with one another and are registered in the molding machine-specific information database 710. At this point, the fitting coefficient obtained by the regression analysis and the model expression may be also registered in the molding machine-specific information database 710. Since the maximum mold opening amount and the remaining mold opening amount are associated with each other, one or both of the amounts is registered as a mold opening amount in the database 710.

A mold opening amount obtained by "a mold with an attached sensor" or "a mold with a built-in sensor" is a value specific to the used mold and has an absolute amount varying depending upon the structure of the mold. It is assumed that a mold opening amount varies between the molding machines with the same mold due to the rigidity that varies depending upon the structure of the molding machine. Thus, a mold opening amount acquired with the same mold can be regarded as a parameter relatively indicating the rigidity of the molding machine. In other words, even in the case of the database of mold opening amounts acquired with different molds, a machine difference cannot be accurately corrected. In this case, a mold opening amount acquired according to the rigidity of the mold is standardized, so that a model difference can be corrected using the database acquired with different molds.

FIG. 21 is a flowchart indicating the detail of step S61 in FIG. 11.

The molding condition correction unit 43 calculates an applied load in an inputted track record in production (S611). The molding condition correction unit 43 acquires the injection-point boundary conditions of the second injection molding machine in the track record in production with reference to, for example, the molding machine-specific information database 710 acquired by the method of Embodiment 4. Subsequently, the molding condition correction unit 43 performs a flow analysis based on the acquired injection-point boundary conditions and the mold structure. From the obtained pressure distribution, an applied load is obtained according to Expression (2). Alternatively, if a cavity pressure is obtained in the track record in production, an applied load may be calculated according to Expression (1).

The molding condition correction unit 43 corrects a set clamping force so as to have an equal mold opening amount relative to the obtained applied load (S612). It is assumed that the applied load of the second molding machine in step S611 is also applied to the first molding machine in order to equalize applied loads in the first molding machine and the second molding machine by correcting a machine difference. The molding condition correction unit 43 first acquires the set value of clamping force of the second injection molding machine and a maximum mold opening amount with respect to an applied load from the molding machine-specific information database 710. The molding condition correction unit 43 then inputs the acquired applied load and maximum mold opening amount with reference to the molding machine-specific information database 710, thereby acquiring the set clamping force of the first molding machine.

The present embodiment configured thus can also achieve the same effects as Embodiment 1. According to the present embodiment, mold opening amounts are caused to agree with each other relative to an applied load in a track record in production, thereby more accurately correcting a machine difference.

The present invention is not limited to the foregoing embodiments and includes various modifications. For example, the embodiments were specifically described to illustrate the present invention. All the described configurations are not always necessary for the present invention. Moreover, the configuration of one of the embodiments can be partially replaced with the configuration of another embodiment or the configuration of one of the embodiments may further include the configuration of another embodiment. Alternatively, the configurations of the embodiments can be partially provided with additional configurations, can be partially deleted, or can be partially replaced with other configurations.

Embodiment 6

Referring to FIGS. 22 to 26, Embodiment 6 will be described below. The present embodiment will describe a method of correcting an amount of resin injected into an injection molding machine, according to molding machine-specific information.

FIG. 1 is a functional block diagram of an injection molding system. A molding condition correction system 4A according to the present embodiment will be described below. The molding condition correction system 4A includes, as described in Embodiment 1, a molding machine-specific information storage unit 41, a molding machine-specific information acquisition unit 42, a molding condition correction unit 43, and a molding machine-specific information learning unit 44.

The molding machine-specific information storage unit 41 has the function of storing molding machine-specific information obtained in advance for each injection molding machine. The molding machine-specific information storage unit 41 of the present embodiment stores a correction value 411 for correcting the molding conditions of a measuring step, as a piece of molding machine-specific information. The molding conditions (also referred to as measuring conditions) of the measuring step may include, for example, a measurement position, a speed switching position, and a VP switching position.

The molding machine-specific information learning unit 44 has the function of extracting a feature amount of a physical quantity based on data (sensing data) from a sensor 57 provided in an injection molding machine 50 or the mold and storing the feature amount as machine difference information in the molding machine-specific information storage unit 41. The molding machine-specific information learning unit 44 of the present embodiment includes a measurement condition learning unit 441 for learning the measurement conditions and registering the conditions in the molding machine-specific information storage unit 41.

As will be illustrated in FIG. 23, the measurement condition learning unit 441 inputs predetermined molding conditions to the injection molding machine, thereby obtaining, from regression analysis, a correction coefficient (regression coefficient) indicating the correlation between a cylinder extrusion amount (an extrusion amount determined by a screw diameter and an extrusion distance from a measurement position to the VP switching position, also referred to as a cylinder extrusion amount) and the volume (injection volume) of an obtained molded article.

FIG. 23 is a schematic diagram indicating a method of producing a database for the measuring step and a method of correcting the measuring step. In the present embodiment, the correlation between a cylinder extrusion amount (extrusion distance) and an injection volume is acquired by molding under molding conditions with a shortage of resin to be injected into the mold, and a regression coefficient is obtained as a correction value by regression analysis on the correlation. The shortage of a resin amount means that the mold still has a space to be filled with resin. For example, a cylinder position (also referred to as a cushion amount) at the end of a dwelling step is located at the same position as the VP switching position. In the present embodiment, even if the injection molding machine is replaced with another, a cylinder extrusion amount is calculated with an equal injection volume by using the regression coefficient.

In a state in the upper part of FIG. 23, injection is performed under speed control from an initial position $X_0$ to a VP switching position $X_{VP}$, and a dwell time and a dwell pressure are both set at 0 to stop a movement of a screw 502 in a cylinder 505.

In a state in the lower part of FIG. 23, it is confirmed that a cushion amount is equal to the VP switching position $X_{VP}$. This injects resin into a mold 509 in a so-called state of shortage.

FIG. 24 is a characteristic diagram of the relationship between an injection volume and a cylinder extrusion amount. The horizontal axis indicates a cylinder extrusion amount while the vertical axis indicates an injection volume. The range from the initial position $X_0$ to the VP switching position is placed in a so-called state of shortage. A range beyond the VP switching position is placed in a filled state. In a filled state, molten resin is pressed into the mold 509, so that an actual value and a theoretical value substantially agree with each other. A theoretical value V of an injection volume is defined by Expression (14).

$$V = (D \times \pi d^2)/4 \qquad \text{(Expression 14)}$$

The actual value can be determined by measuring the weight of a molded article 521 removed from a mold 509 and dividing the measured weight by the density of resin.

Originally, even if an extrusion amount is changed, the volume of resin (cylinder extrusion amount) injected into a cavity 520 in the mold 509 from the cylinder 505 is to be equal to the volume (injection volume) of the molded article 521 of the resin. However, in a so-called state of shortage, a theoretical value indicated by a dotted line and an actual value indicated by a solid line in FIG. 24 are different from each other.

FIG. 25 is a block diagram indicating a method of collecting a correction value (regression coefficient) for correcting information on the measuring step, that is, part of molding machine-specific information.

Any molding condition 701 is first inputted to an actual injection molding machine 702, thereby acquiring a physical quantity at a predetermined point in a mold 703. Quality including the volume of a molded article 704 can be acquired by a product quality inspection 707.

A measurement condition learning unit 441 of the molding machine-specific information learning unit 44 determines, based on a detection signal from a molding-machine sensor 705, whether a cushion amount and the VP switching position agree with each other as illustrated in FIG. 23 (711).

If the cushion amount does not agree with the VP switching position (711: NO), the measurement condition learning unit 441 returns to block 701 and waits for a detection signal from the molding machine sensor (705).

If the cushion amount agrees with the VP switching position (711: YES), the measurement condition learning unit 441 opens the mold and removes the molded article to measure the weight of the molded article (712). Since the density of resin forming a molded article is known, the measurement condition learning unit 441 calculates the volume of the molded article from the weight and density of the molded article (713).

The measurement condition learning unit 441 performs regression analysis on the measured value of the injection volume in block 713 and calculates a regression coefficient serving as a correction value (714). The calculated regression coefficient is stored in the molding machine-specific information storage unit 41 (715).

FIG. 26 is an explanatory drawing indicating an example of a method of correcting a parameter for the measuring step. In a first step S1 in the upper part of FIG. 26, as described above with reference to FIG. 25, a cylinder extrusion amount is changed for molding in a so-called state of shortage, and the correlation of an injection volume relative to a cylinder extrusion amount is acquired to perform regression analysis. In this case, calculations for matching a measured value and a theoretical value are performed for a molding machine A and a molding machine B as indicated by Expressions (15) and (16) below:

$$V_{m,A} = \alpha_A \cdot D_A (\pi d_A^2/4), \; D_A = x_{0,A} - x_{VP,A} \qquad \text{(Expression 15)}$$

$$V_{m,A} = \alpha_B \cdot D_B (\pi d_B^2/4), \; D_B = X_{0,B} - x_{VP,B} \qquad \text{(Expression 16)}$$

where $V_m$ is a measured value of an injection volume, d is a screw diameter, D is a cylinder extrusion amount, α is a regression coefficient, $X_0$ is a measurement position, $x_{VP}$ is the VP switching position, and A and B are molding machines.

In a second step S2 in the lower part of FIG. 26, the regression coefficient determined in the first step S1 is used to correct molding conditions for the measuring step as indicated by Expression (17), Expression (18), and Expression (19):

$$x_{0,B} = (d_A^2/d_B^2) x_{0,A} \qquad \text{(Expression 17)}$$

$$x_{i,B} = x_{0,B} - (\alpha_A d_A^2/\alpha_B d_B^2)(x_{0,A} - x_{i,A}) \qquad \text{(Expression 18)}$$

$$x_{VP,B} = x_{0,B} + (\alpha_A d_A^2/\alpha_B d_B^2)(x_{0,A} - x_{VP,A}) \qquad \text{(Expression 19)}$$

where xi is an i-th speed switching position.

According to the present embodiment configured thus, a resin amount (volume or weight) for injecting resin into the mold is corrected based on the molding machine-specific information, thereby more properly correcting the injection molding conditions than in Embodiment 1.

Moreover, according to the present embodiment, resin is injected into the mold in a so-called state of shortage, the volume of the molded article is measured, and regression analysis is performed on the measured value, so that a coefficient for correcting the resin amount can be accurately determined in advance.

The present invention is not limited to the foregoing embodiments and includes various modifications. The embodiments were specifically described to illustrate the present invention. All the described configurations are not always necessary for the present invention. Moreover, the configuration of one of the embodiments can be partially replaced with the configuration of another embodiment. Moreover, the configuration of one of the embodiments may include the configuration of another embodiment. Alternatively, the configurations of the embodiments can be partially provided with additional configurations, can be partially deleted, or can be partially replaced with other configurations.

When the analytical value of a physical quantity at the predetermined point of the injection molding machine agrees with the measured value of a physical quantity at the predetermined point in the mold attached to the injection molding machine, the molding machine-specific information may be information on the correlation between a set clamping force under any molding conditions and the measured value of a mold opening amount at another predetermined point (predetermined position) in the mold while the integral pressure of the projection area of the cavity serves as an applied load.

All the characteristics of the injection molding system may be described as the characteristics of a molding condition correction system. Moreover, a combination of characteristics disclosed in the present embodiment is not limited to the description of the scope of claims.

What is claimed is:

1. An injection molding system configured of one or more computers each including a microprocessor and a storage device, the system comprising the steps of:
    determining a manufacturing condition including a combination of a first mold and a first injection molding machine;
    confirming presence or absence of a first track record in production, in which a combination of the first mold and the first injection molding machine is used, by searching a production-track-record storage unit; and
    producing, in a case of the absence of the first track record in production, a corrected molding condition for injection molding by using the combination of the first injection molding machine and the first mold, based on first molding machine-specific information acquired in advance for the first injection molding machine, second molding machine-specific information acquired in advance for a second injection molding machine that is combined with the first mold and has a second track record in production, and the second track record in production acquired from the production-track-record storage unit,
    wherein
        the corrected molding conditions are produced such that the first injection molding machine and the second injection molding machine have the same part quality,
        the step of producing the corrected molding condition corrects at least an amount of resin injected from the first injection molding machine to the first mold, and
        the produced corrected molding condition is inputted to the first injection molding machine.

2. The injection molding system according to claim 1, wherein the respective molding machine-specific information indicates a relationship between a theoretical value and a measured value when resin is injected into the mold attached to the injection molding machine under a predetermined injection condition.

3. The injection molding system according to claim 2, wherein the predetermined injection condition includes alignment of a screw position at a time of ending of a dwelling step and a screw position (VP switching position) for switching between injection and dwelling.

4. The injection molding system according to claim 2, wherein the respective molding machine-specific information includes information in which an extrusion distance from a measurement position to a VP switching position, a screw diameter of the injection molding machine, and a volume of an obtained molded article are associated with one another in injection molding performed by inputting a molding condition to the injection molding machine, the molding condition including changes of a screw position at a time of ending of a dwelling step, a screw position for switching between injection and dwelling (VP switching position), and the measurement position in a range where the dwelling step is set at 0 seconds in an unloaded state.

5. The injection molding system according to claim 1, wherein the step of producing the corrected molding condition includes producing the corrected molding condition by correcting a measurement position, a speed switching position, and a VP switching position by using a predetermined transformation, based on first molding machine-specific information, second molding machine-specific information, and the second track record in production.

6. The injection molding system according to claim 1, further comprising the step of registering, in the production-track-record storage unit, a quality test result of a product injection molded by the second injection molding machine under the corrected molding condition.

7. The injection molding system according to claim 6, wherein in a case of injection molding performed by inputting any molding condition to the injection molding machine, the any molding condition and a measured value of a physical quantity at a predetermined point in the mold attached to the injection molding machine are associated with each other in the molding machine-specific information.

8. The injection molding system according to claim 7, wherein the physical quantity includes at least one of a mold opening amount, a temperature, a pressure, and an amount of resin injected into the mold.

9. A molding condition correction system comprising one or more computers each including a microprocessor and a storage device, the system being configured to correct a molding condition inputted to an injection molding machine,
    wherein the system is started in absence of a first track record in production in which a combination of a first mold and a first injection molding machine is used,
    the molding condition is corrected to correct at least an amount of resin injected from the first injection molding machine into the first mold, based on first molding machine-specific information acquired in advance for the first injection molding machine, second molding machine-specific information acquired in advance for a second injection molding machine that is combined with the first mold and has a second track record in production, and the second track record in production,
    the first molding machine-specific information and the second molding machine-specific information indicate a relationship between a theoretical value and a measured value when resin is injected into the mold attached to the injection molding machine under a predetermined injection condition, and
    the corrected molding conditions are produced such that the first injection molding machine and the second injection molding machine have the same part quality.

10. An injection molding method causing a computer to perform the steps of:
    determining a manufacturing condition including a combination of a first mold and a first injection molding machine;
    confirming presence or absence of a first track record in production, in which a combination of the first mold and the first injection molding machine is used, by searching a production-track-record storage unit; and
    producing, in a case of the absence of the first track record in production, a corrected molding condition for injection molding by using the combination of the first injection molding machine and the first mold, based on first molding machine-specific information acquired in advance for the first injection molding machine, second molding machine-specific information acquired in advance for a second injection molding machine that is combined with the first mold and has a second track record in production, and the second track record in production acquired from the production-track-record storage unit, wherein
- the corrected molding conditions are produced such that the first injection molding machine and the second injection molding machine have the same part quality,
- the step of producing the corrected molding condition corrects at least an amount of resin injected from the first injection molding machine to the first mold, and
- the corrected molding condition is inputted from the computer to the first injection molding machine.

* * * * *